United States Patent [19] [11] 3,969,969
Clark, Jr. et al. [45] July 20, 1976

[54] MUSICAL INSTRUMENT WITH MEANS FOR SCANNING KEYS

[75] Inventors: Melville Clark, Jr., Chochituate; David A. Luce, Natick, both of Mass.

[73] Assignee: Melville Clark, Jr., Cochituate, Mass.

[22] Filed: July 22, 1974

[21] Appl. No.: 490,385

Related U.S. Application Data

[62] Division of Ser. No. 148,514, June 1, 1971, abandoned.

[52] U.S. Cl. .................................. 84/1.26; 84/1.11; 84/1.07
[51] Int. Cl.$^2$ .......................................... G01H 1/02
[58] Field of Search .................. 84/1.01, 1.11, 1.22, 84/1.19, 1.21, 1.24, 1.07, 1.03, 1.26, DIG. 7, DIG. 8, DIG. 23

[56] References Cited

UNITED STATES PATENTS

| | | | |
|---|---|---|---|
| 3,288,909 | 11/1966 | Volodin | 84/1.01 X |
| 3,507,970 | 4/1970 | Jones | 84/1.01 |
| 3,515,792 | 6/1970 | Deutsch | 84/1.03 |
| 3,604,299 | 9/1971 | Englund | 84/1.03 |
| 3,610,799 | 10/1971 | Watson | 84/1.01 |
| 3,626,075 | 12/1971 | Hiyama | 84/1.11 |

*Primary Examiner*—Ulysses Weldon
*Attorney, Agent, or Firm*—Charles Hieken; Jerry Cohen

[57] ABSTRACT

A new, performer played, real time, multitonal, multimbral musical instrument consists of speed and force sensitive keys in which time domain multiplexing is used to find and associate one and only one tone generator, not otherwise busy, with any key that is depressed. The sound generator disclosed can provide very realistic simulations of the flute, oboe, trumpet, French horn, trombone through the provision of various types of modulations in amplitude and frequency of the various partials, as is characteristic of each instrument simulated, and filtered noise. Glissandi are provided from one note to another and are controlled from the pair of keys involved by the relative pressure with which they are depressed. For the nonpercussive tonalities, the speed with which a key is depressed, which is determined by differentiating the force, may be used to cause the attack transient to behave in a manner very characteristic of the instrument being simulated. The force with which a key is depressed is determined from the rate of rise of the potential across a capacitive keying system excited through a resistor. Percussive sound generators are provided also; the intensity of the notes generated by these generators is determined by the speed with which the associated key is depressed. The force with which the associated key is depressed can be used to determine the rate of automatic repetition of the note. The speed with which a key is depressed can also be used for nonpercussive instruments to alter the character of the attack transient.

23 Claims, 28 Drawing Figures

ALL TRANSISTORS 2N5172

MUSICAL INSTRUMENT WITH MEANS FOR SCANNING KEYS

This is a division of application Ser. No. 148,514, filed June 1, 1971 now abandoned.

A new, highly controllable and flexible musical instrument that is played in real time consists of keys and pedals (notes) sensitive to the speed and force of depression, tone generators, and a high speed switching system which controls percussive and nonpercussive tone generators. The switching system associates tone generators with depressed notes for the duration of the depression, thus requiring only as many tone generators as the maximum number of notes sounding simultaneously. The switching system makes it economically feasible to provide the degree of control and types of tone generators essential to the creation of the sounds of many musical instruments as they are actually played in music, as well as entirely new sounds. The system makes possible note-controlled glissandos, note-controlled frequency modulation, and automatic note repetition. The switching system permits the use of a variety of note-controlled transducers, for example, variable capacitors free of limited-life, noisy contacts, the capacitance being sensed from the rise time of a strobe pulse. Each tone generator is sufficiently flexible that it is intrinsically capable of creating the sounds of many musical instruments over their full frequency and intensity ranges by means of keyboard or pedalboard control, yet sufficiently specialized that only a few, low-cost components and connections are required.

A new musical instrument is described that is capable of creating the sounds of instruments used in symphony music, chamber music, popular music, concertos, band music, and so on.

The philosophy of and features desired in new musical instruments are discussed in Melville Clark, PROPOSED KEYBOARD MUSICAL INSTRUMENT, J. Acoust. Soc. Am., 31, 403–419 (1959). The instruments conceived there and here are real time electronic systems on which a player may perform. The instruments are controlled by keys or pedals on which it is possible to play many notes simultaneously (multitonal capability) with one or more tone colors (multitimbral). In musical instruments belonging to this class, it is necessary to provide a separate tone generator, such as an oscillator or frequency divider element, for each note. Further, such an organization severely limits the resources that can be provided to generate and control the tone color of each note because of the cost involved. Usually these resources are limited to those that can serve all notes in common associated with a particular tone color.

In practice, it is observed that a keyboard instrument is provided with many more keys and pedals than are ever sounding, much less played, at any one moment. Thus, the equipment serving most of the notes lies idle most of the time. For example, a practical instrument may be provided with two 88 note keyboards and one 32 note pedalboard or 208 notes in all. A reasonable upper limit to the number of notes that can be played at any one time is 14, because a person has only 10 fingers and two feet. (He might play as many as 4 notes with 2 feet using both his heel and toe of each foot.) (It is recognized that more than one note may be played by a finger or toe or heel on very rare occasions. It will be seen that this possibility can be accommodated.) Thus, approximately 14 ($208/14 \approx 14$) times as many notes are provided as a player can possibly actuate at any one time. Of course, for a few tuned, percussive instruments with a long decay, e.g., notes played sostenuto on a piano or on a vibraphone, more notes will be sounding than played. There might perhaps be as many as 20 or even 25 notes sounding simultaneously (say 3 notes per octave, 7 or 8 octaves for a very long arpeggio), but even for this extreme case, the number of notes sounding is much less than the number of notes provided.

This invention discloses a switching system that makes it necessary to provide only as many tone generators as the maximum number of such generators that one desires to sound at any one time. It will be seen that this switching system is sufficiently simple that far greater resources at a given cost can be associated with each note of the instrument for the generation and control of the timbres associated with that note. Further, since usually one can accept a limit of 8 or fewer notes being sounded simultaneously, it is possible to design practical instruments with even greater reduction (26 times) in complexity.

Basically, the switching system connects a tone generator only to those notes that are depressed for the duration of the depression. Thus, only as many tone generators need be provided as notes that are simultaneously sounding.

This switching concept has a number of other advantages.

Only a small number of connections need to be provided to the keying system. (Five wires plus the power lines are needed for the keying system in the version implemented.)

The generation of new and unusual sounds is trivially facilitated.

Sound generators compatible wit electronic music studio equipment are made possible.

A monotonal capability is feasible in which only one note can be sounded on a particular clavier at any given time.

The addition of more tone colors is simple and major modifications are obviated. The design is inherently modular.

The frequencies of the notes of a clavier may be easily changed over a wide range. Thus, one may readily tune the instrument to different frequency standards.

Transposition is easily accomplished automatically by the instrument so that the performer need not be burdened by this chore.

A clavier may be divided in timbre, one tone color being provided at one end and another being provided at the other end. Thus, without adding to the complexity, advantage may be taken of the fact that some simulated instruments require 80 or more different notes, whereas others require as few as 12.

It is practical to provide a clavier individual to each timbre.

Tunings in other temperaments are easily achieved. For example, a piano is commonly tuned to a modified equal temperament, called the Railsbeck stretched scale, in which the low notes are somewhat lower and the high notes somewhat higher than would be dictated by strict adherence to an equal tempered scale. The keyboard interval may be easily changed to a microtonal scale.

Separate power amplifiers and speakers can be used for each note sounded. Thus, since the partials of many musical sounds are harmonic and since harmonic distortion is much less perceivable than intermodulation distortion, efficient and inexpensive loudspeakers can be used. Interharmonic distortion will be absent simply because no partial nonharmonically related to any other is presented to a particular loudspeaker.

Truly independent tone colors can be generated when several instruments play the same note (doubling). This is essential; the waveforms will be phase incoherent. With many designs, the several waveforms are phase coherent and a tone color is created that is the average of the tone colors of the several instruments doubling each other.

It is practical to provide noncontacting keys and/or pedals. These are relatively free of wear compared with other keying methods and free of electrical and acoustic noise problems.

The sounds produced may be controlled by the speed with which a key or pedal is depressed. This makes possible intensity control of percussive instruments and attack control of nonpercussive instruments.

The sounds produced may also be controlled by the force with which a key or pedal is depressed. This feature can be used for the intensity and/or timbre control of nonpercussive instruments.

The same transducer may be used for speed sensing, force sensing, and ON/OFF control, thereby reducing costs.

Two independent sensors can be accommodated by each key or pedal without any basic circuit modification.

Either key and/or pedal or external control of percussion sustain provides a sostenuto feature for the percussive instruments.

Glissandos may be generated easily and precisely by controlling the forces of depression of two notes when the instrument is in the glissando mode.

Repetition of percussion tones at a rate controlled by the force of depression of a note is easily provided.

A natural, sustained decay transient of the proper frequency can be produced after the related note is released.

Sustained, percussion sounds of the proper frequency can be produced.

DESCRIPTION OF DRAWINGS

Other features, objects, and advantages of the invention will become apparent from the following specification when read in connection with the accompanying drawings in which.

An assertion applied to an S or R input of a multivibrator sets or resets it, respectively. An assertion appears at the S output and a negation at the R output of a multivibrator that is set, and conversely. A multivibrator changes state regardless of the state it is in when a suitable trigger is applied to a T (toggle) input. An assertion applied to the R input of a counter, shift register, detector, or address register resets the device to its initial state. A signal applied to the C input of a gate, integrator, gated device, modulator, voltage-controlled amplifier, generator, or limiter switches, modulates, or controls the information-bearing signal applied to the other input or controls the internal generation of a signal itself. If information passes or is transmitted through a gate, that gate is open; if information is blocked and can not pass through, the gate is closed. The following groups of terms are synonymous: (AND, AND gate) in digital functions, (gate, analog gate) in analog functions, (OR, OR gate), (flip flop, bistable multivibrator), (univibrator, monostable multivibrator). Analog gates may consist of a bipolar or field-effect transistor with the gating signal applied to the base or gate with the current of the switched signal flowing through the other two terminals. A shunt gate shorts out some element, e.g., a capacitor, when an assertion is applied to its control terminals. Elements in different figures identical or equivalent to each other bear the same reference number. Capacitances are in μfd, resistances in ohms.

DESCRIPTION OF INVENTION

Figure 1:
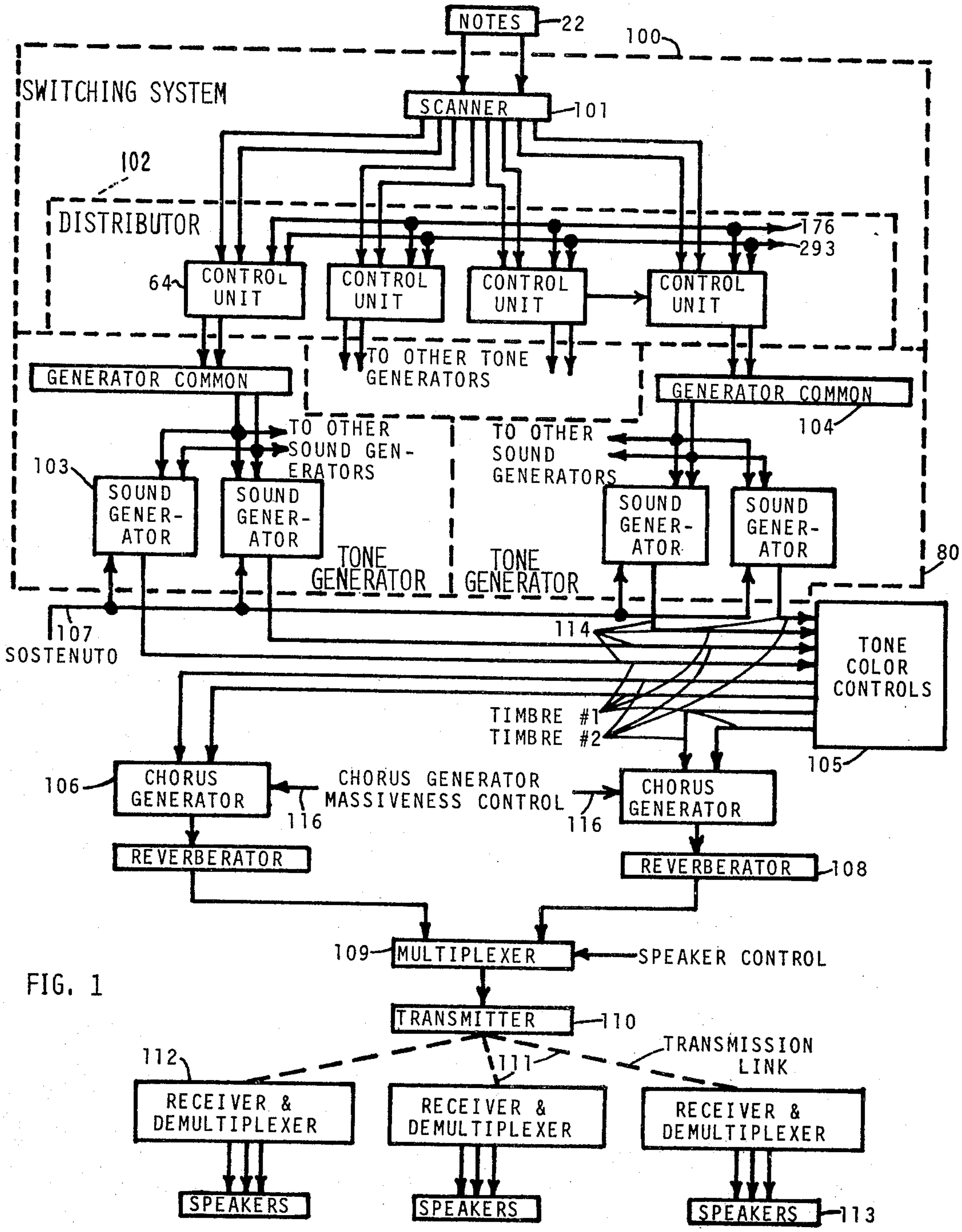
FIG. 1 is a block diagram of the complete musical instrument.

FIG. 1 is a block diagram of a complete musical instrument. The notes 22 interact with the scanner 101 of the switching system 100. The switching system 100 is comprises of two parts: the scanner 101 and the distributor 102. The distributor 102, in turn, is comprised of one or more control units 64. Each control unit 64 is connected to a tone generator 80. Within each tone generator 80 there is a common section 104 and one or more sound generators 103. There are as many control units 64 and tone generators 80 as notes 22 that one desires to sound simultaneously.

The purpose of the switching system is to associate a note 22 with a tone generator 80. The responses of the switching system 100 to various complexions of the notes 22 and the control units 64 associated with the tone generators 80 are displayed in Table 1. The logic in the switching system 100 provides the functions listed. The system 100 achieves high scanning speeds in the face of requirements for accurate sampling and complex logical decisions by exploiting the fact that, in the case that occurs very frequently, no sampling is done and the logical decisions are very simple, and by stopping for a suitable period in the much less frequently occurring cases in which accurate sampling must be done and complex logical decisions made.

A gate 4 is associated with each note 22. Each gate 4, i.e., each note 22, is strobed ON in sequence, permitting each gate 4 to pass information concerning the status of the note 22 to the tone generator 80 circuitry. This information consists of:

Table 1

Response of the switching system 100 to various states of the notes 22 and the busy-idle status of control units 64.

| Status of note address | Status of note | Response of system | Frequency of occurrence |
|---|---|---|---|
| Found in one of the control units | Has been depressed for a while (Depressed) | Delay scanner Reload note address, FM control, & force in proper control unit | Occurs |
| | Recently released (Not depressed) | Reset address indicator | Rare |
| Not found in any control unit | Not depressed | Go on to next note | Very frequent |
| | Recently depressed (Depressed) | Delay scanner Find control unit with reset address & load it with note address, FM control, & force | Rare |

1. The vertical force with which a note 22 is depressed.

2. The horizontal force exerted on a note 22.

The rate of change of force will be called the "speed of note depression", since in some keying systems, the force and displacement are related to each other. The system can calculate the speed of depression since the notes 22 are examined at a high scanning rate, about 1500 times per second. An indication as to whether or not a note 22 is depressed may be obtained by determining whether a force greater than a certain minimum has been applied to the note. The horizontal force exerted on the note may be used to perturb the frequency of the note. For percussive tones, the force may be used to control the rate of automatic repetition of a note.

The tone color control system 105 determines the mixture of the tone colors from each of the sound generators 103, there being different mixtures, in general, for each clavier with which the notes are associated. The outputs of the sound generators 103 are applied to chorus generators 106 that create choral tones from solo tones, in the manner described in Melville Clark, PROPOSED KEYBOARD MUSICAL INSTRUMENT. J. Acoust. Soc. Am., 31, 403–419 (1959). The controls 116 for the chorus generators 106 determine the degrees of choral massiveness applied to each output from each sound generator 103 and whether or not any choral effect is applied to these outputs. The outputs of the chorus generators 106 are applied to a multiplexer 109. The output of the multiplexer 109 is applied to a transmitter 110 that radiates ultrasonic or electromagnetic signals 111. These signals are picked up by receivers 112, demultiplexed 112, and applied to speakers 113. The transmitter 110 and receivers 112 are of any standard type. The purpose of multiple speakers 113 is described in Melville Clark, PROPOSED KEYBOARD MUSICAL INSTRUMENT, J. Acoust. Soc. Am., 31, 403–419 (1959). Such a system obviates the need for wires running from the musical instrument proper to the speakers. The transmitters 110 may be of low power if the distances involved are short.

If only one note 22 is applied to any one speaker 113, instead of many different notes 22, as is customary, then the speaker 113 can be of relatively poor quality because any intermodulation distortion present will only modify the harmonic spectrum in an unperceivalbe manner.

Figure 2:
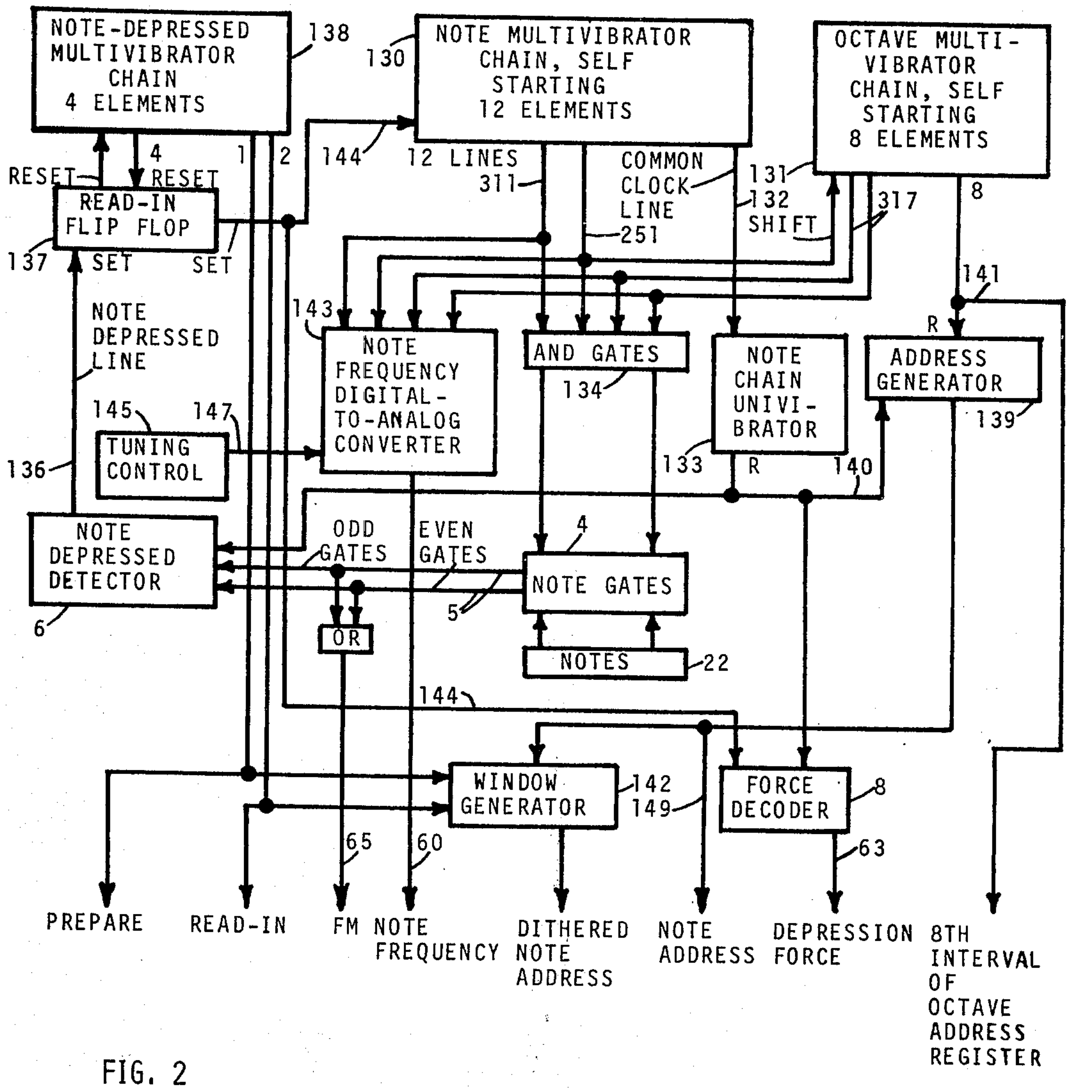
FIG. 2 is a block diagram of the scanner part of a first switching system.

FIG. 2 is a block diagram of the scanner part 101 of a first switching system 100 used in the musical instrument.

A self-starting 12-element note-multivibrator chain 130 provides the basic timing sequence for the scanner. This chain defines the note 22 that is to be sensed within a particular octave. The note chain 130 drives an 8-element octave-multivibrator chain 131 that defines the octave of the note being examined.

The note-multivibrator chain 130 has a common clock output 132. A short pulse appears on this output 132 each time the multivibrator chain 130 advances and provides a time reference that is used to determine whether or not there is a minimum time delay for the note-gate 4 emitter potential to reach a threshold level introduced by the capacitance connected to the base of each note-gating transistor 310. The pulse on the common clock line 132 drives a univibrator 133 that defines this minimum time. (In the scheme implemented, this univibrator pulse is approximately 2 μsec long.)

The note and octave chains 130 and 131 excite AND gates 134 that are used to select a note 22 by means of a note gate 4. Each note gate 4 is switched ON with a delay monotonically related to the force with which the note 22 is depressed whenever the AND gate 134 preceding that note gate 4 has an assertion on all its input terminals. Further details will be presented in connection with FIG. 13.

A univibrator 133 is connected to the note-depressed detector 6. If the note 22 is depressed with sufficient force, the capacitance between ground and the base of its note-gating transistor 310 will be great enough that the rise time to a specific threshold potential on common output lines 5 to which the note-gating transistors 310 are connected will exceed the duration of the univibrator pulse 140. The note-depressed detector 6 will then produce an assertive output, which implies that the note 22 is depressed.

The note-depressed-detector output 136 is applied to the read-in flip flop 137. The set output 144 of the flip flop 137 prohibits the advancing of the note-multivibrator chain 130 and, thus, any advancement of the note and octave chains. The strobing of additional note gates 4 is delayed for a time (called the "read-in time") long enough to extract, via the note-gate 4, the force with which the note 22 is depressed, i.e., the capacitance at the note gate 4, the potential corresponding to the frequency of the note 22 depressed, and a potential related to the address of the note 22 that is depressed. This read-in time is subdivided into four subintervals. These four intervals are generated by the note-depressed multivibrator chain 138. The read-in flip flop 137 triggers the first stage of the note-depressed chain 138 and generates a pulse that runs down the chain.

The read-in flip flop 137 statically gates and latches each of the individual elements of the note-multivibrator chain 130, thus latching this note chain 130 into whatever state it is found when the read-in flip flop 137 is triggered. The octave-multivibrator chain 131 does not advance because of the absence of a trigger from the note chain 130.

Once a note 22 is found depressed, it is necessary for the switching system 100 to determine if there is a control unit 64 already associated with this note 22. To this end, the address of the note is compared with the address stored in all of the control units 64. If an assertion occurs in any control unit 64 within a minimum period of time, information is read into the control unit 64 creating the assertion, and the reading of information into any new control unit 64 is prevented.

The address of a note is a potential proportional to the serial number of that note. (It is convenient to have a signal linearly proportional to the serial number of a note 22 rather than to the exponential of the serial number.) The address generator 139 is a staircase generator: Output pulses 140 from the note-chain inivibrator 133 are integrated linearly. The integrator is reset by the last stage 141 of the octave chain. The signal from the address generator 139 provides the addresses of the notes that are sampled and stored in the various control units 64.

A window generator 142 alters this potential in one direction during the first interval of the note-depressed chain 138 and in the other sense during the second interval of this chain. This altered signal is called the dithered note address and is used to test the address stored in all control units 64 to determine if any is within tolerance of the address of the note currently being strobed.

The third interval of the note-depressed chain 138 is used to delay resetting the system 101 prior to the next advancement of the note chain 130. The read-in flip flop 137 is then reset by the fourth interval output of the note-depressed chain 138.

Figure 20:
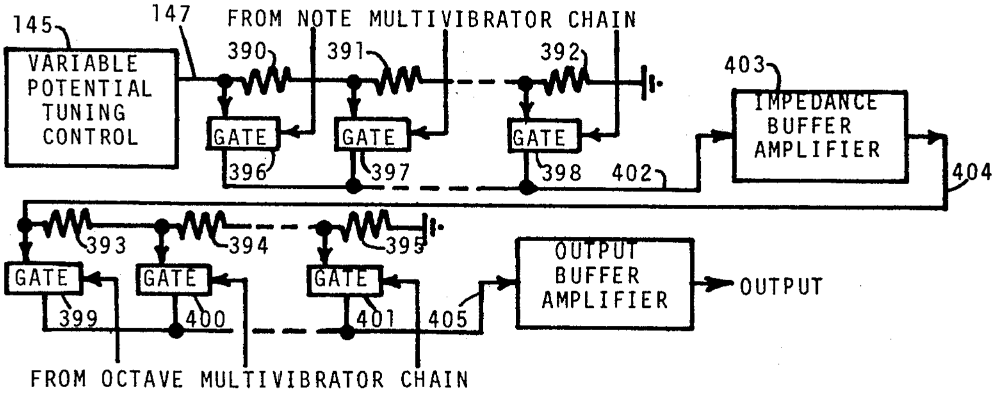
FIG. 20 is a block diagram of a digital-to-analog converter used to generate the frequency control voltage of an associated note.

The frequency of the note is represented by a potential proportional to that frequency. This potential is generated by the note-frequency digital-to-analog converter 143. This converter 143 is excited by the note and octave chains 130 and 131. The details of this converter are shown in FIG. 20.

The force decoding circuit 8 is excited by the output signal 144 from the read-in flip flop 137 that prevents the advancement of the note chain 130 and the univibrator 133 that drives the note-depressed detector. As the force on the note increases, the time between the end of the univibrator 133 pulse 140 and the output pulse 136 from the note-depressed detector 6, which is synchronous with the turning OFF of the reset output of the read-in flip flop 137, increases. A potential 63 proportional to this time interval is generated by a runup circuit (see FIG. 14), which is reset by the output of the fourth interval of the note-depressed chain 138.

The speed of depression of each note 22 is computed in the associated tone generator 80 because of the sequential examination of each note. The only place where the force signal can be differentiated to determine the speed of depression of a note is in the control unit 64 associated with that note where information is stored identifying that force function with the particular note. An alternative is to put a speed sensor at each note and to transmit this information by a suitable gate to the associated tone generator in the manner of the force function. This alternative would require a speed sensor for each tone generator, as in the preferred method.

Figure 3:
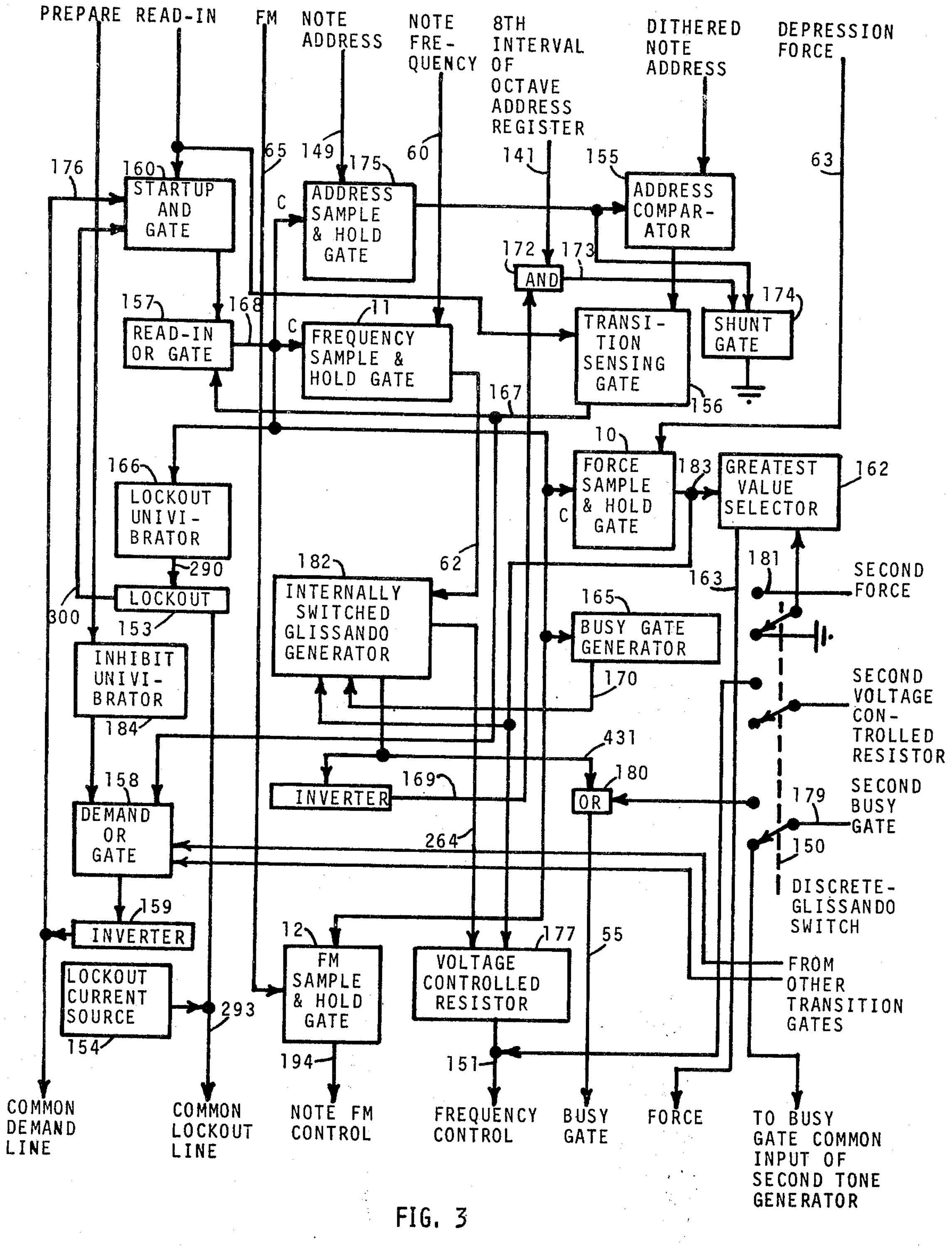
FIG. 3 is a block diagram of the control system common to each tone generator, which is located in the distributor of the first switching system and which provides a first glissando means.

FIG. 3 displays one of the control systems 64 present in the distributor 102 of the first switching system 100. Each tone generator 80 is provided with a number of sound generators 103 capable of generating the various tone colors present in the musical instrument. There are two modes of operation of the control units 64. The first mode is that in which the frequency is discrete and where one and only one of these control units 64 is associated with each tone generator 80. In this mode, the control unit 64 produces a discrete set of frequencies, each frequency signal being associated with one and only one note. The second mode is that in which the frequency may be continuous, i.e., the so-called glissando mode. Two methods of achieving the glissando mode are disclosed. In the first type of glissando mode, which is controlled by the discrete-glissando switch 150, two control units 64 are used in conjunction with one tone generator to produce a frequency control signal representing a frequency between the two depressed notes attended by the two control units 64. The precise value of the frequency control signal 151 produced in this first glissando mode is determined by the relative forces of depression of the associated notes 22. For this first glissando mode, there are two and only two control units 64 simultaneously active in (or connected to) the scanner. The glissando generator 182 provides the second way of producing a glissando. An internal switch within this generator determines whether discrete or continuous frequencies are to be generated. In the discrete mode, the input frequency control signal 62 is merely transmitted unaltered to the output frequency control line 264. In the glissando mode, generator 182 provides a frequency control signal 264 that varies in a linear fashion from the value of the frequency control signal stored in the control unit during the depression of the previous note 22 to the value of the frequency signal 62 associated with the note presently depressed. The rate of linear rise may be controlled by the force of depression of the note 22 presently depressed. Details of this circuit are presented in FIG. 21.

The operation of the control unit 64 in the discrete mode is described first. To this end, the discrete-glissando switch 150 is in the position shown and the switched glissando generator 182 is in the discrete mode. There are two possible states of each control unit 64: busy and idle. The busy status means that the control unit 64 is associated with some note 22, whether that note 22 is depressed or not. The idle status means that the control unit 64 is not associated with any note 22. There are two substates of the idle state: ready and reserve. Only one control unit 64 associated with the scanner 101 can be in the ready status at any one moment. The control unit 64 in the ready state is the one that next becomes associated with a newly depressed note 22. A control unit 64 in the reserve status implies that the unit is both idle and not in the ready state. These states are defined by the status of a lockout element 153 in each control unit. In the busy status, the lockout element 153 is disabled, and no current flows through it. In the reserve status, the lockout element 153 is enabled, but no current flows through the lockout element 153. In the ready status current supplied by the lockout current source 154 flows through the lockout element 153.

Initially, one control unit 64 is ready and all others are in reserve. For both conditions, there is a zero address (for example, a capacitor potential) stored in any control unit 64, i.e., the potential across the address storage capacitor is zero. All input lines to the control units 64 may be considered idle during the scanning process until a note 22 is found that is depressed. When a note 22 is found depressed, the potential denoting the address of the note 22 is moved through a tolerancing range, but no comparator 155 assertion takes place during the comparison with the zero potential stored across the address capacitor. As a result, the output from the transition sensing gate 156, when it is enabled during interval 2, is a negation. This condition will be true for all control units 64 initially. The output of each read-in OR gate 157 in each tone generator 80 will be a negation initially. There will be a negation in the output from the demand OR gate 158; this negation is inverted 159 to an assertion that is applied to all startup AND gates 160 in all tone generators 80.

One of the control units 64 is held in the ready status. This means that the lockout element 153 of this control unit 64 is ON and has won this status away from all other control units 64, and an assertion is applied to one of the inputs to the startup AND gate 160. When a note 22 is found depressed, interval 2 is applied to the third input of this AND gate 160 and during this interval a startup assertion is applied to the read-in OR gate 157. An assertion occurs at the output of the demand OR gate 158 and causes sampling of the following signals through respective sample and hold gates 10, 11, and 12:

1. The frequency determining signal 60 from the note frequency digital-to-analog converter 143. This signal, modified by a frequency control signal 147 from a tuning control 145, determines the frequency of the voltage-controlled oscillator 370 in the tone generator 80.

2. The signal 63 correlated with the force with which the note 22 is depressed. The output 183 of the sample and hold gate 10 excites a greatest value circuit 162. This output 183 is the only input to this circuit in the discrete mode; the output 163 of this circuit is, therefore, the input signal itself in the discrete mode.

3. The note address 149, which is stored in the control unit 64 to provide a signal to the address comparator 155, which governs the read-in process after startup of the particular control unit 64.

4. A frequency modulation signal 65 proportional to the horizontal force exerted on the note 22.

The assertion from the read-in OR gate 157 also activates the busy-gate generator 165. This gate 165 remains ON for a time equal to the period the note 22 is depressed plus about three scan cycles. The assertive output from the read-in OR gate 157 also triggers a univibrator 166 that charges up the holdoff capacitor attached to the lockout element 153. This univibrator 166 disables the lockout element 153 associated with this control unit 64 to prevent a false startup of this control unit 64 while it is busy. (This statement means that the output of the lockout element 153 is a negation, the lockout element 153 is OFF, no current flows through it.)

Interval 2 eventually ends. Once started, this control unit 64 will not be associated with other notes that may be depressed during the scan, because the serial number capacitor will store a potential different from that corresponding to any other note 22. Thus, there will be no transition during the comparison between the serial number potential stored in this control unit 64 and that corresponding to any other note 22, and the output 167 of the transition sensing gate 156 will be a negation. Since the lockout element 153 associated with this control unit 64 is OFF, i.e., disabled, the output is a negation, and no assertion can appear from output of the startup AND gate 160. Thus, only a negation appears at the output of the read-in OR gate 157 of this control unit 64 when other notes 22 are scanned.

On the next scan, if the note 22 is still depressed, there will be an assertive transition of the transition detector 156 during the comparison between the serial-number potential stored in the control unit 64 and that of the note 22 by the tolerancing signal. This assertion causes an assertion in the output 168 of the read-in OR gate 157, causing the same actions as listed above when an assertion appears at this output.

The busy-gate generator 165 is a peak detector with a time constant of about three full scan cycles (about 3 msec in the version implemented) followed by a voltage discriminator to provide a gate pulse with transitions well defined in time. The output 170 of the busy-gate generator 165 is applied to the glissando generator 182 where, when this generator 182 is idle, the busy-gate signal is directly transmitted to the busy-gate line 431.

Eventually, the depressed note 22 is released. The sequence of pulses produced by the lockout univibrator 166 that charge up the capacitor at the lockout 153 input cease, and the potential across this capacitor drifts towards zero. The univibrator 166 will no longer disable the lockout element 153. The drift of the input to the lockout element 153 enables the lockout element 153 and changes the status of the control unit from busy to reserve-idle. In either case, the lockout element 153 is OFF, and not conducting any current.

A univibrator 184 is excited at the end of interval 1, the prepare interval. This univibrator 184 applies a signal to the demand OR gate 158 to inhibit its output until such a time that the comparator 155 has settled down.

The inverse 169 of the busy-gate signal 431 and the output 141 from the 8th stage of the octave shift register and AND'ed 172 together. The output 173 of this AND gate 172 excites a shunt gate 174 connected between the address sample and hold capacitor 175 and ground. Thus, when a note 22 is released, the inverted busy-gate signal 169 goes ON and, then, when the 8th interval 141 of the octave register next goes ON, the shunt gate 174 resets the address capacitor potential to zero. This action prevents the potential across the address capacitor from drifting into the potential of some other note 22 that may be depressed, thereby accidentally causing two control units 64 to serve the same note.

If more notes 22 are depressed than there are control units 64, then nothing happens until a note 22 is released, whereupon the control unit 64 thereby freed is pressed into service for the new note 22. When more notes 22 are depressed than there are control units 64, no lockout elements 153 in and control unit 64 provides an assertion at the startup AND gate 160. This property of the lockout elements 153 is explained in the description of FIG. 12. There is no output from this gate 160 even though there is an assertion on the common demand line 176 indicating there are notes 22 requesting attention. Thus, the new note 22 will be attended as soon as and only as soon as a control unit 64 becomes idle. This control unit 64 immediately goes into the ready status and then into the busy status as soon as the new note 22 is scanned.

We now consider operation of the control unit 64 in the first type of glissando mode. As mentioned previously, two and only two control units are connected to the scanner 101 in this case. Switch 150 is actuated to the position other than that displayed. Thus:

1. Connecting the force signal 181 from the second control unit 64 to the greatest value circuit 162, the other input of which is connected to the force signal 183 of the first control unit 64. The output from this greatest value circuit 162 is the greatest of the two forces of depression of the two notes 22. The value of this greatest force 22 is then used for appropriate control purposes by the tone generator 80 attached to the first control unit 64.

2. Connecting together the two outputs of the voltage-controlled resistors 177 that are connected to the frequency sample-and-hold gates 11 of the two active control units 64. Since the voltage-controlled resistors 177 are controlled by the forces with which the associated notes 22 are depressed, the potential appearing at the interconnection point of the resistors 177 will be between the potentials of the two frequency sample-and-hold gates 11 and will be determined by the ratio of the two forces. By making the maximum to minimum values of the voltage-controlled resistors 177 very large (say 1000 to 1), essentially continuous voltage division between the two input voltages can be effected. In addition, the intermediate frequency may be generated independently of the greatest value of the force functions, since one can vary independently the greatest force and the ratio of the force.

3. Connecting the second busy gate 179 to the OR gate 180 that is in series with the busy gate 165 of the first control unit 64, so that activation of either control unit 64 will cause the activation of the tone generator 80 attached to the first control unit 64.

4. Interrupting the busy-gate signal 179 connected from the second control unit 64 to its associated tone generator 80. This prevents any signal generation by the second tone generator 80.

Thus, when any note 22 is depressed, either the first or second control units 64 will be activated in the glissando mode. If only a single note 22 is depressed, the idle control unit 64 will not affect the busy control unit 64. However, as soon as a second note 22 is depressed, the second control unit 22 will become active in that the force with which the second note 22 is depressed will modify the frequency and possibly the effective force function used by the tone generator 80.

Figure 4:
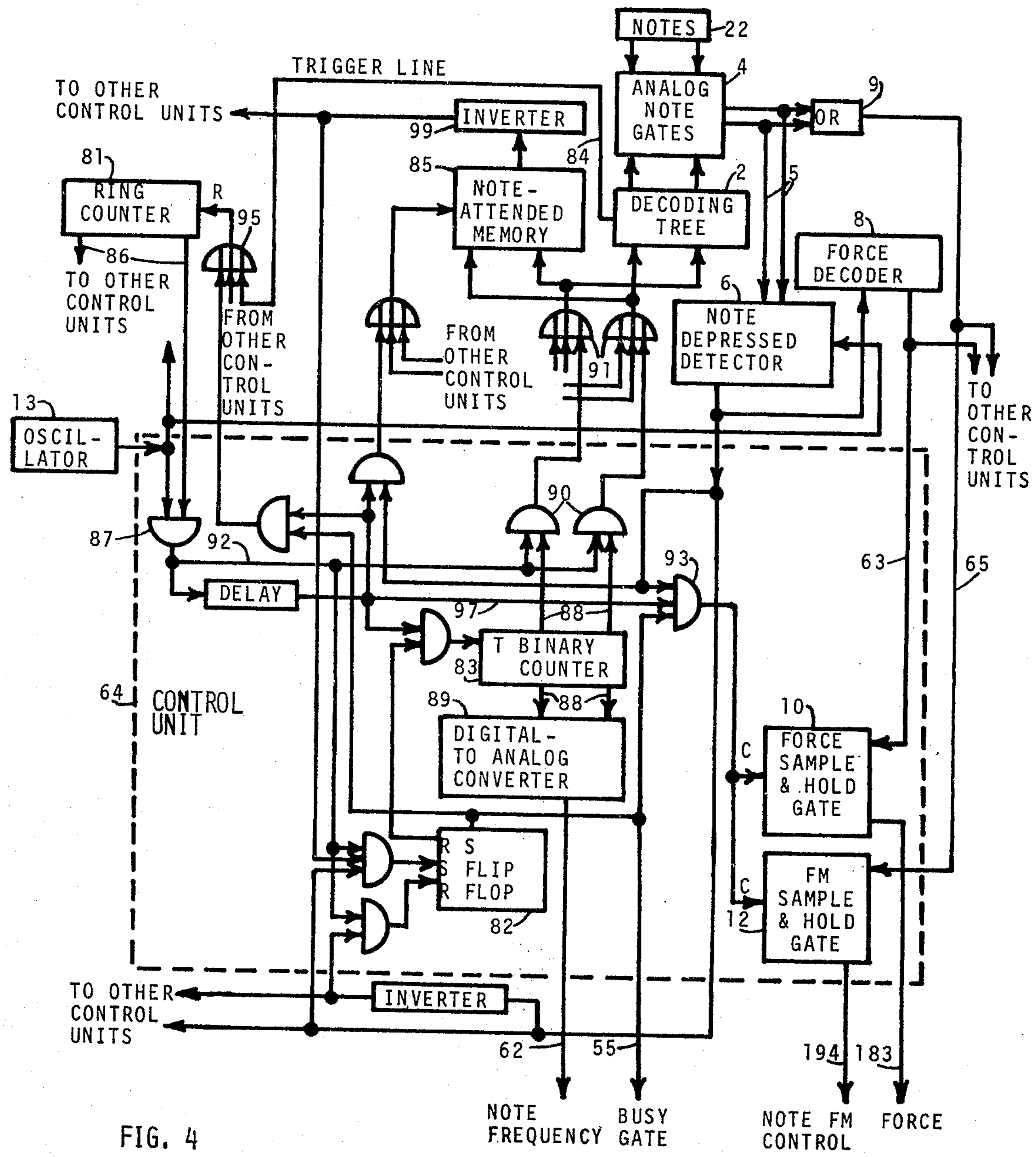
FIG. 4 is a block diagram of a second switching system. It is largely digital.

FIG. 4 is a block diagram of a second electronic switching system, which is based primarily on digital components and which serves the same function as the first switching system shown in FIG. 1. The present system consists of the following major components:

1. A plurality of control units 64, one being associated with each tone generator 80.

2. Analog note gates 4, one associated with each note 22. These gates transmit an electrical signal 63 related to the force with which a note 22 is depressed and a second signal 65 related to the horizontal force exerted on the note, as described in connection with FIG. 13.

3. Note-depressed detectors 6 identical to those described in connection with FIG. 11.

4. A ring counter 81 that activates control units 64 in sequence.

5. An oscillator 13 that provides basic timing functions for the system.

6. A flip flop 82 in each control unit 64 that, when set or reset, indicates whether the associated control unit is busy or idle, respectively.

7. A binary counter 83 in each control unit 64 that generates the note scanning address 88 and which stores the address of the associated note 22 when the control unit 64 goes into the busy state.

8. A decoding tree 2 to translate the addresses in the binary counters 83 into serial note addresses. The final output 84 of the decoding tree 2 advances the ring counter 81 after a complete scan of all notes 22.

9. A note-attended memory 85 that indicates whether or not there is a control unit 64 associated with each note 22. If the bit is an assertion at the address of the note 22, there is a control unit 64 associated with the note 22 (whether or not it is depressed); if the bit is a negation at the note address, then there is no control unit 64 associated with the note (whether or not the note is depressed).

10. A force decoder 8 that transforms the time delay between an oscillator 13 pulse and the appearance of a signal from the note-depressed detectors 6 into a potential 63.

The operation of various elements is as follows:

1. The ring counter 81 outputs 86 gate clock pulses from the oscillator 13 into one control unit 64 at a time by means of an AND gate 87 associated with each control unit 64.

2. The binary counter 83 in the activated control unit 64 is advanced one count if the busy-idle flip flop 82, i.e., if the control unit 64, is idle.

3. The outputs 88 of the activated binary counter 83 are applied to a digital-to-analog converter 89, the note-attended memory 85, and the decoding tree 2 by suitable sequential AND 90 and OR 91 gates, the AND gates 90 being controlled by the output 92 of the ring counter AND gate 87.

4. The control unit 64 turns ON the busy-gate line 55 connected to a tone generator 80 whenever the control unit 64 is associated with a note 22. The control unit 64 also uses an AND gate 93 strobed by the oscillator 13 whenever the control unit 64 is associated with the note to sample and hold, 10 and 12, the output 63 of the force decoder 8 and FM OR gate 94 to be presented to the tone generator 80.

5. The busy-idle flip flop 82 is reset synchronously with the oscillator 13 strobe pulse 92 if the flip flop 82 is in the set state and if the note 22 that is addressed is no longer depressed. The flip flop 82 is set synchronously with the oscillator 13 strobe pulse 92 if it has been previously reset, if the note 22 that is addressed is depressed, and if this note 22 is not attended by any other control unit 64.

6. An assertion bit is written into the appropriate note-attended memory 85 cell if the note 22 addressed by the decoding tree 2 is depressed. A negation bit is written into this note-attended memory 85 cell if the note 22 addressed is not depressed.

7. The ring counter 81 is advanced by the oscillator 13 strobe pulse 92 if either the control unit 64 is busy, as indicated by the idle-busy flip flop 82 being set, or if all notes 22 in the instrument have been scanned and the decoding tree 2 addresses the ring counter 81 by line 84. All but the final output 84 of the decoding tree 2 address notes; this final output 84 drives the ring counter 81 through a suitable OR gate 95. Thus, if all depressed notes 22 are attended by control units 64 other than a particular, idle one being advanced, the ring counter 81 is advanced by 1 count at the end of a scan to select a new control unit 64. Thus, notes that are depressed will be periodically re-examined and the status of the associated control units 64 will be periodically updated to reflect any changes in the condition of the associated notes since they were last examined.

We consider a particular color unit 64 and the action of the logic for each of the possible states of the note 22 the address of which is stored in the binary counter 83 in that control unit 64:

A. The addressed note has not been depressed for several scans:

1. An assertion at the output 92 of the ring-counter-oscillator AND gate 87 opens AND gates 90 between the binary counter 83 of the particular control unit 64 and the note-attended memory 85 and the decoding tree 2 input OR gates 91.

2. The note-attended memory 85 cell addressed is a negation; the negation is inverted 99.

3. The note-depressed detectors 6 are in the negation state.

4. The flip flop 82 in the particular control unit 64 is reset.

5. A negation is rewritten into the note-attended memory 85 cell addressed by the binary counter 83.

6. The binary counter 83 is advanced one count.

7. A negation is produced on the busy-gate line 55 connected to the tone generator 80.

B. The note addressed is depressed, but not attended:

1. The assertion at the output 92 of the ring-counter-oscillator AND gates 87 opens the gates 90 and 91 between the binary counter 83 of the activated control unit 64, and the note-attended memory 85 and the decoding tree 2.

2. The note-attended memory 85 provides a negation, which is inverted 99.

3. The note-depressed detectors 6 provide an assertion.

4. The flip flop 82 of the activated control unit 64 is set.

5. An assertion is written into the note-attended memory 85 cell addressed by the binary-counter 83.

6. The binary counter 83 is prohibited from counting when the flip flop 82 is set.

7. The busy gate 55 connected to the tone generator 80 is turned ON; the outputs of the activated note 22 are sampled and held 10 and 12.

C. The note is depressed and attended by the particular control unit 64:

1. The next assertion from the ring counter and oscillator AND gates 87 opens the gates 90 and 91 between the binary counter 83 of the activated control unit 64, and the note-attended memory 85 and decoding tree 2.

2. The note-attended memory 85 provides an assertion, which is inverted.

3. The note-depressed detectors 6 provide an assertion.

4. The flip flop 82 in the control unit 64 selected by the ring counter 81 is left in its set state (by not being reset).

5. An assertion is rewritten into the note-attended memory 85 cell addressed by the binary counter 83.

6. The binary counter 83 is not advanced.

D. The note is not depressed, but is attended by a particular control unit 64: (The note has just been released.)

1. The next assertion from the ring-counter-oscillator AND gates 87 opens the AND gates 90 between the binary counter 83 of the particular control unit 64 and the note-attended memory 85 and decoding tree 2.

2. The note-attended memory 85 provides an assertion which is inverted 99.

3. The note-depressed detectors 6 provide a negation.

4. The flip flop 82 of the activated control unit 64 is reset.

5. A negation is written into the note-attended memory 85 cell addressed.

6. The binary counter 83 is advanced 1 count.

7. A negation is produced on the tone-generator busy-gate line 55.

E. A particular note 22 is depressed and attended by a control unit 64 other than the particular one of interest. At the first assertion from the ring-counter-oscillator AND 87 output:

1. This assertion opens the AND gates 90 between the binary counter 83 of the selected control unit 64, and the note-attended memory 85 and decoding tree 2.

2. The note-attended memory 85 provides an assertion, which is inverted 99.

3. The note-depressed detectors 6 provide an assertion.

4. The flip flop 82 in the activated control unit 64 is left in the reset state by not being set.

5. An assertion is rewritten into the note-attended memory 85 cell addressed.

6. The binary counter 83 in the selected control unit 64 is advanced 1 count.

7. A negation is produced on the tone-generator busy-gate line 55.

In general, not all control units 64 will be busy, yet all depressed notes 22 may be attended. In this case, an idle control unit 64 will ultimately be selected by providing a trigger 84 from the decoding tree 2 to the ring counter 81 at the end of a complete scan of all notes 22.

In the case where a control unit 64 is associated with a note 22 and the note 22 is depressed, the busy-idle flip flop 82 gates 93 a delayed clock pulse 97 into two sample-and-hold gates 10 and 12. These two gates 10 and 12 sample and hold the force 63 and the frequency modulation 65 functions, each of which is passed along to the tone generator 80 associated with the control unit 64.

The digital address of the control-unit binary counter 83 is converted to a potential 62 in a digital-to-analog converter 89. This potential 62 is used in the tone generator 80 associated with the control unit 64 for generation of the actual frequency signal 460.

The force decoder 8, which converts the time between the transition of the applied oscillator 13 pulse and the appearance of an output signal of the note-depressed detectors 6 is the same as that described for the first switching system. This is also true for the note-depressed detectors 6 and the analog note gates 4.

Figure 5:
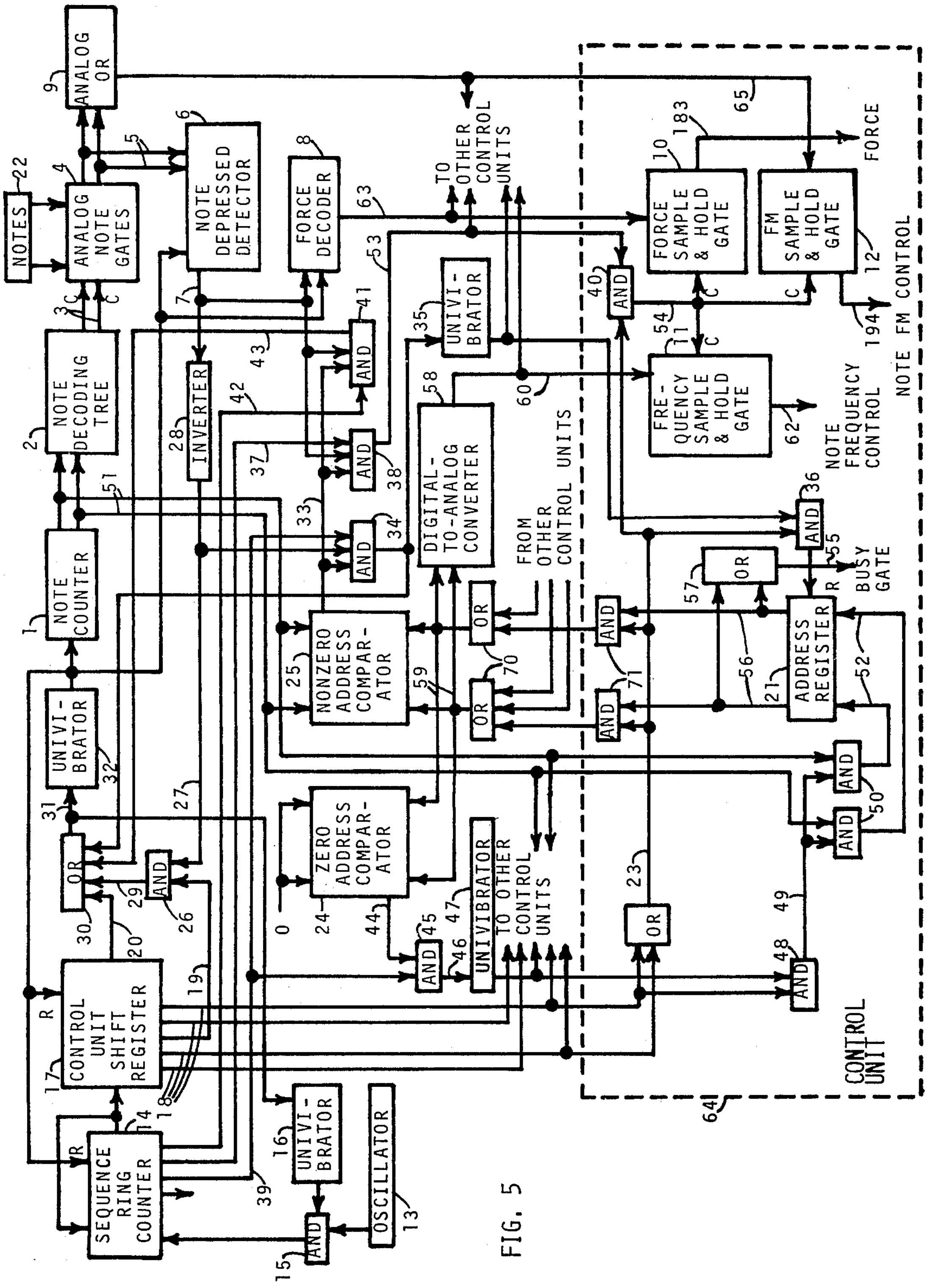
FIG. 5 is a block diagram of a third switching system. It is also largely digital.

FIG. 5 is a block diagram of a third electronic switching system. A note counter 1 provides a serial number for each note in the instrument. If, as will be assumed, the musical instrument contains two 61 note keyboards and one 32 note pedalboard, there will be 154 notes in the instrument, and an 8-bit binary counter will suffice for the note counter 1. A note decoding tree 2 provides one control line 3 for each of the 154 states of the note counter 1, which is connected to the gate input of the analog-note gate 4 associated with each note 22.

The even and odd note-gate outputs 5 are connected to the note-depressed detector 6 in the manner described for the first switching system. The time delay between the note-counter 1 advance signal and the appearance of an output signal on either the even or odd note-gate lines 5 is examined by the note-depressed detector 6 and, if it exceeds a certain amount, an assertion is produced on the note-depressed detector output 7. This time delay is converted into a potential by the force decoder 8 and applied to the force sample-and-hold gate 10 in each control unit 64 in the manner described for the first switching system. The even and odd note-gate outputs 5 are OR'ed 9 together and applied to the frequency modulation sample-and-hold gates 12 in each control unit 64 in the manner described for the first switching system.

Control of the sample-and-hold gates 10, 11, and 12 and sequencing of the note counter 1 will not be explained. An oscillator 13 drives a sequence ring counter 14 through an AND gate 15. This AND gate 15 prevents the oscillator 13 from advancing the sequence ring counter 14 for a specific period of time until spurious system transients have decayed. To this end, the reset output of a first univibrator 16 is applied to the other input of the AND gate 15. The sequence ring counter 14 provides up to five sequential pulses to the system and also drives a control-unit shift register 17. If, as will be assumed in the following, there are 10 control units 64, then the control-unit shift register 17 must have 22 stages. The shift register provides 10 pairs of control lines 18 and two additional lines 19 and 20, each of which provides a count advancing pulse. One of each pair of control lines 18 is used for address comparison and the other for address storage. There is a one-to-one correspondance between control units 64 and pairs of control lines 18.

Each control unit 64 contains an address register 21 that stores the binary address of the note 22 with which the control unit 64 is associated, if any. The address-comparison signal 18 from the control-unit shift register 17 opens AND gates 71 between the address register 21 of the corresponding control unit 64 and two binary comparators 24 and 25, which are common to all control units 64. One binary comparator 24 determines if the address in the control unit 64 is zero. If the address is zero, the control unit 64 is idle and not yet associated with any note. The second binary comparator 25 determines if the address in the control unit 64 is equal to that of the note counter 1. For each state of the control-unit shift register 17, the oscillator 13 advances the sequence ring counter 14 through its five states, unless reset prior to this time. If the contents of the address register 21 is neither zero nor equal to that of the note counter 1, then the sequencing ring counter 14 merely advances the control-unit shift register 17 one step and the next control unit 64 is activated. The process continues until the addresses in all 10 control-unit address registers 21 have been examined in sequence. After these addresses have been examined, a special pulse 19 from the control-unit shift register 17 is AND'ed 26 with a note-is-not-depressed signal 27. This signal 27 is generated by an inverter 28 connected to the output 7 of the note-depressed detector 6. The output 29 of the AND gate 26 is applied to a master OR gate 30. The trailing edge output 31 from this OR gate 30 triggers a second univibrator 32, the output of which is connected to the input of the note counter 1, to the reset input R of the control-unit shift register 17, and to the reset input R of the sequence ring counter 14. The OR gate 30 also triggers the first univibrator 16, the output of which is AND'ed 15 with the output of the master clock oscillator 13. This first univibrator 16 prevents the oscillator from advancing the sequence ring counter until all system transients have decayed.

If the address in a particular control-unit address register 21 is found to be equal to that of the note 22 being examined, but the note 22 is not depressed (because it has been just released), the address register 21 is reset to zero, thereby putting the control unit 64 into the idle status. To this end, the output 27 of the inverter 28 attached to the note-depressed detector output 7 is AND'ed 34 with the output 33 of the nonzero address comparator 25, which is assertive, and the second stage output 39 of the sequence ring counter 14. The assertion from this AND gate 34 is applied to an input of the master OR gate 30. The fall of the output from this AND gate 34 also triggers a third univibrator 35; the output of this univibrator 35 is AND'ed 36 with the control-unit select line 23, and the output of this AND 36 is applied to the address-register 21 reset input R.

On the other hand, if the note 22 is depressed when the address in the control-unit address register 21 is found to be equal to that of this depressed note 22, the note-depressed detector 6 output 7 is assertive. This assertion is AND'ed 38 with the third stage output 37 of the sequence-ring counter 14 and the equality output 33 of the nonzero address comparator 25. The output of this AND gate 38 is AND'ed 40 with the control-unit select signal 23 from the control-unit shift register 17, and the output of this last AND gate 40 is the control input for the sample-and-hold gates 10, 11, and 12 in the selected control unit 64. The frequency modulation output 65 of the note passes through the analog note gate 4 and the analog OR gate 9, and is sampled by the control-unit FM sample-and-hold gate 12. The output 7 of the note-depressed detector 6 is also AND'ed 41 with the equality output 33 of the nonzero address comparator 25 and the output 42 of the fourth stage of the sequence ring counter 14, and the output 43 of this AND gate 41 is applied to the master OR gate 30. The fall of the fourth stage output signal 42 from the sequence ring counter 14 triggers the first 16 and second 32 univibrators, connected to the input of the AND gate 15 attached to the sequence ring counter 14, and the input to the note counter 1, respectively.

If the note 22 is depressed and if no control-unit address register 21 is found with an address equal to the binary address of the note 22, then the note address is read into the address register 21 of the first control unit 64 that is found idle, i.e., with an address register 21, the contents of which is initially zero. To this end, the equality output 44 of the zero comparator 24 and AND'ed 45 with the output of the second stage 39 of the sequence ring counter 14, and the output 46 of this AND 45 triggers a fourth univibrator 47. This output of this univibrator 47 is AND'ed 48 with the control-unit select signal 18 from the control-unit shift register 17, and the output 49 of this AND 48 is multiply AND'ed 50 with the eight bits at the output 51 of the note counter 1. The outputs 52 of these eight AND gates 50 are applied to the bit inputs of the address register 21. The nonzero address comparator equality output 33, the output 37 of the third stage of the sequence ring counter 14, and the assertion of the note-depressed detector 6 are AND'ed 38 together, and the output 53 of this AND gate 38 is AND'ed 40 together with the control-unit select signal 23. The output 54 of this last AND gate 40 is used to open the control-unit sample-and-hold gates 10, 11, and 12. Further, the equality output 33 of the nonzero address comparator 25, the output 42 of the fourth stage of the sequence ring counter 14, and the assertive output 7 of the note-depressed detector 6 are AND'ed 41 together. The output 43 of this AND gate 41 is applied to the master OR gate 30.

A busy-gate signal 55 is generated in each control unit 64 by examination of the address register outputs 56 with an OR gate 57, the output 55 of which will be assertive if any nonzero address is stored in the address register 21, a condition indicating that this particular control unit 64 is busy.

A digital-to-analog converter 58, drivien by the inputs 59 to the address comparators 24 and 25 generates a potential 60 proportional to the frequency of the note with which a control unit is associated. The potential 60 thus generated is sampled and held 11 during the third interval 37 of the sequence ring counter 14 if the contents of the address register 21 is equal to that of the note 22 being examined, if the note 22 is depressed, and if the particular address register 21 belongs to the control unit 64 selected. This potential 62 is applied to a voltage-controlled oscillator 370 in the tone generator to generate the actual frequency signal 460.

Figure 6:
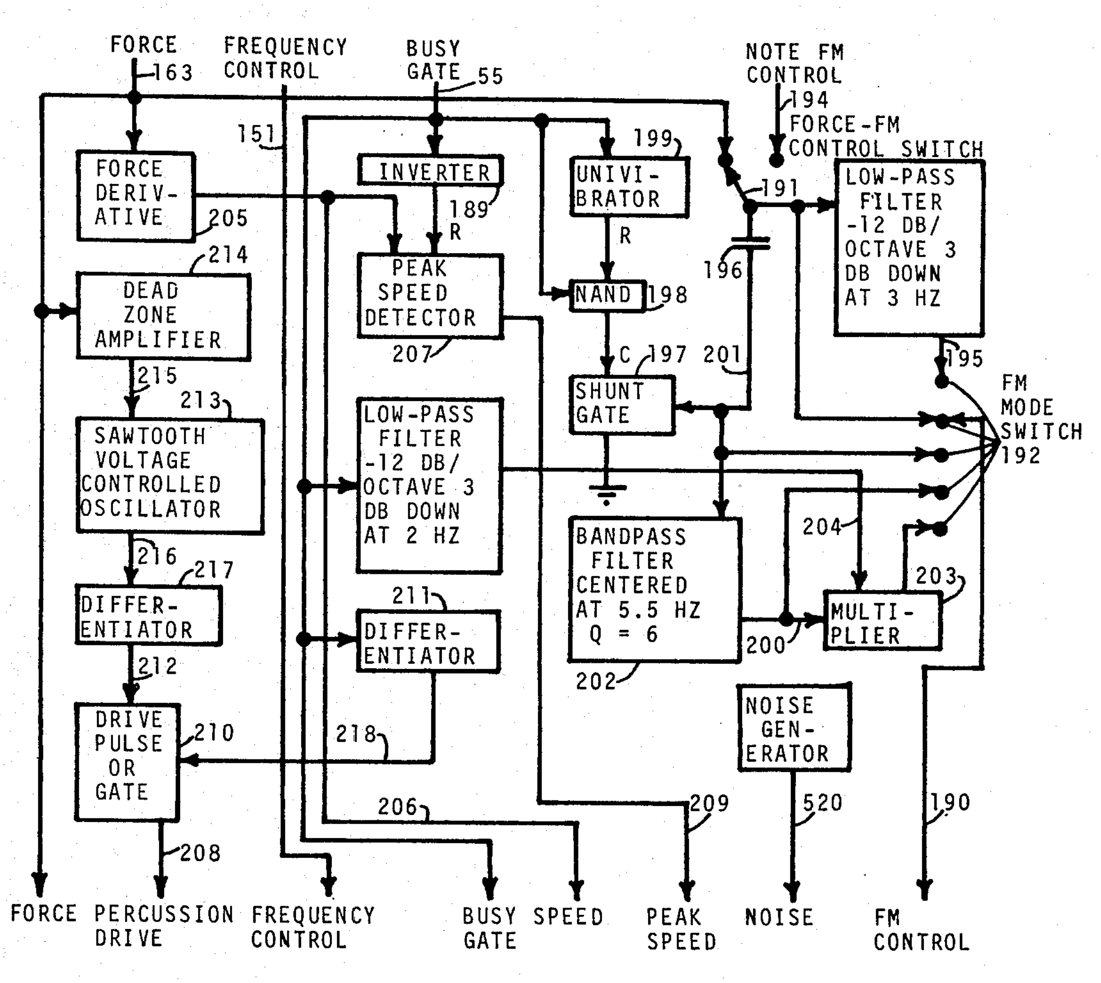
FIG. 6 is a block diagram of the apparatus used with all switching systems in each tone generator shared in common with all sound generators in that tone generator.

FIG. 6 is a block diagram of the apparatus associated with each tone generator 80 that is shared in common with all the sound generators 103 associated with a particular tone generator 80.

Figure 16:
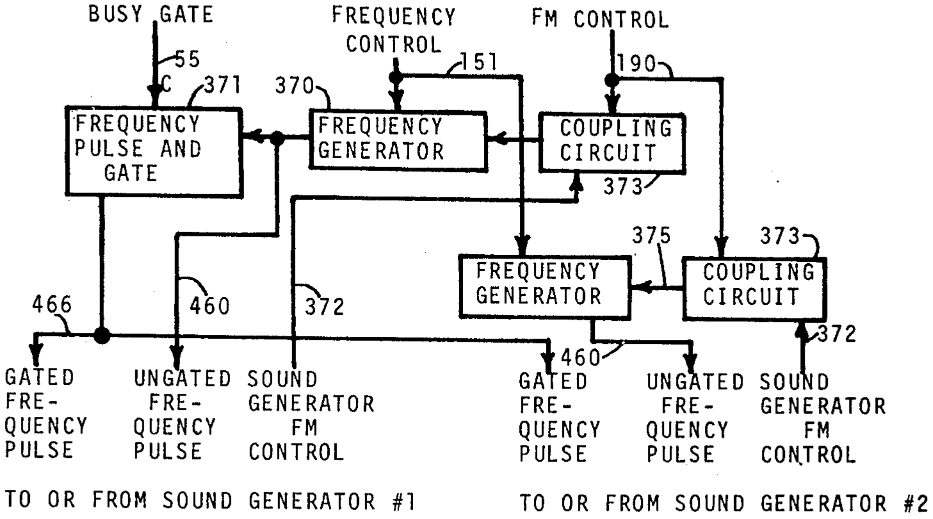
FIG. 16 is a block diagram of a first frequency generating apparatus.
Figure 17:
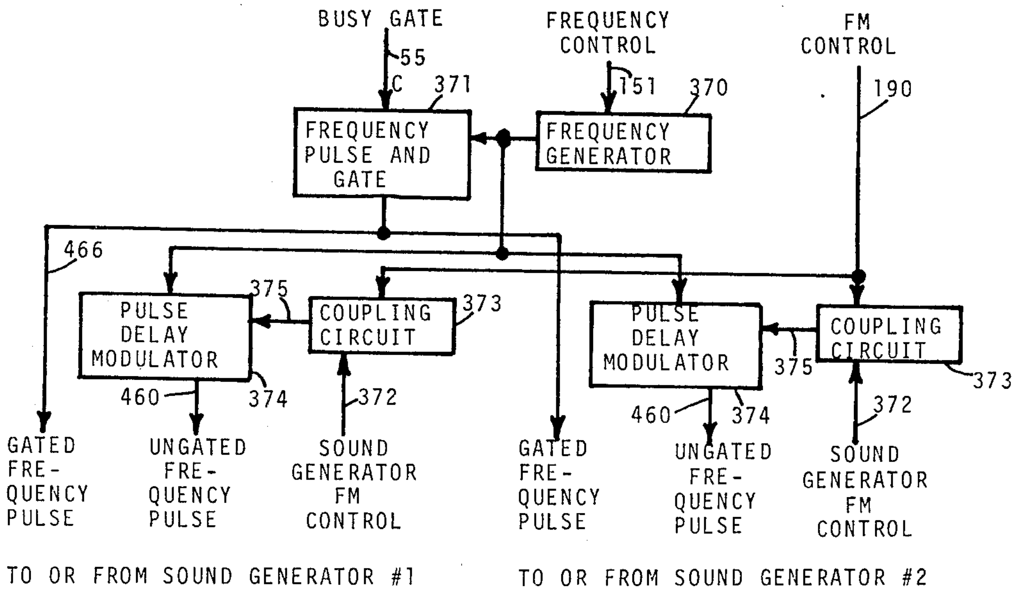
FIG. 17 is a block diagram of a second frequency generating apparatus.
Figure 18:
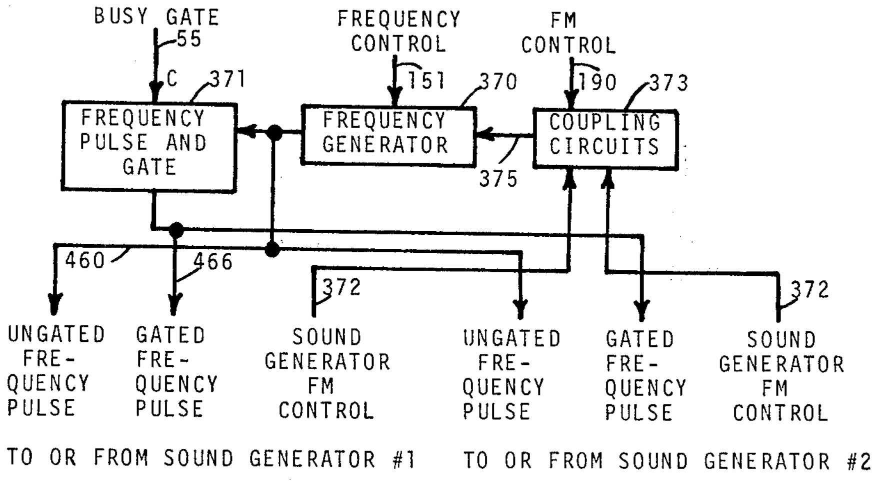
FIG. 18 is a block diagram of a third frequency generating apparatus.

The frequency-control-signal 151 input drives frequency generators 370. These may be voltage-controlled oscillators. They provide the basic frequency signals for the sound generators 103 associated with the tone generator 80. Various types of frequency generators 370 that may be used are shown in FIGS. 16, 17, and 18. In addition to being controlled by the frequency-control signal 151, modulation of the frequency generators 370 about their center frequencies is caused by the FM control signal 190, one of several possible signals selected by force-FM-control switch 191 and the FM mode switch 192. The types of frequency modulation signals that are used are generated by circuitry driven by the force signal 163, the FM control signal 190, and the busy-gate signal 55. The force-FM-control switch 191 selects the force 163 or note-FM control signal 194 to modulate the frequency generator 370. The FM mode switch 192 selects one of the five following types of signals for frequency modulation purposes:

1. A low-pass filtered version 195 of either the force 163 or note-FM-control signal 194, as determined by the force-FM-control switch 191.

2. Either the force 163 or note-FM-control signal 194 directly coupled, as determined by the force-FM-control switch 191.

3. A "restored" version of the force 163 or note-FM-control signal 194, as selected by the force-FM-control switch 191. This restored signal 201 is generated by direct coupling through a capacitor 196 across the output of which appears a shunt gate 197 driven by a NAND gate 198, which is, in turn, driven by the busy-gate signal 55 and the reset output R of a univibrator 199, which is triggered when the busy-gate 55 turns ON. When the busy gate 55 is OFF, the NAND gate 198 and, as a result, the shunt gate 197 are ON, thus preventing any signal being transmitted through the coupling capacitor 196. When the busy gate 55 goes ON, the univibrator 199 is triggered, and the reset output R of this univibrator 19 goes OFF, which continues to hold the NAND gate 198 ON and, thereby, the shunt gate 197 ON. When the univibrator 199 finally goes OFF, the reset output R goes ON, turning OFF the NAND gate 198 and, thereby, turning OFF the shunt gate 197. At this time, the capacitor 196 can transmit the force 163 or note-FM-control 194 signal to the frequency generators 370. This capacitor 196 restoration procedure prevents the transients in the force 163 or FM-cntrol 194 signals that occur during the initial striking of a note 22 from reaching the frequency generators 370 and producing undesirable frequency modulations.

4. A bandpass filtered version 200 of the signal 201 described in (3) above. The bandpass filter 202 is centered at 5.5 Hz, which is a common tremolo or vibrato frequency. This filter prevents slowly and rapidly varying aspects of the force 163 or FM-control 194 signal from reaching the frequency generators 370, thus allowing, for example, the player to change the force 163 on the note 22 slowly for the purpose of controlling the intensity of the note 22 without causing undesirable frequency modulations. The bandpass filter 202 could be connected directly to the force 163 or note-FM-control 194 signal, but transients in the force 163 or note-FM-control 194 signals will shock excite the filter 202 causing undesirable frequency modulations.

5. The signal 200 described in (4) above multiplied 203 by a low-pass filtered version 204 of the busy-gate signal 55. Basically, the low-pass filtered version 204 of the busy-gate signal 55 is just one that starts at zero when the note 22 is depressed and rises slowly with time. This signal 200, when multiplied 203 by the signal described in (4) above, provides a frequency modulation capability that slowly increases with time by means of the force 163 or note-FM-control 194 signals. This capability facilitates simulating the increasing magnitude of vibrato or tremolo with time, as normally occurs in playing many musical instruments. It also further inhibits the appearance of transient-excited oscillations of the bandpass filter 202 at the frequency modulation input 190 of the frequency generator 370.

The force-function output 163 of the control unit 64 is differentiated 205 to create a potential 206 proportional to the speed with which the note 22 is depressed. This speed function is used by the sound generators 103 to generate waveform modifications that are typical of the instrument simulated when it is excited in a transient manner. The speed function 206 is used to control "burple" generation in brass instrument sound generators 103, for example. The speed signal 206 is applied to a conventional peak-value detector 207. The peak detector 207 has a reset input R driven by an inverter 189 that is, in turn, driven by the busy gate 55. When the busy gate 55 is OFF, the tone generator 80 is idle, and the reset input R of the peak-speed detector 207 is turned ON, which resets the peak value stored in the detector to zero, preparing it for the next busy state. The peak-speed detector 207 controls the amplitudes of the signals produced by the percussion sound generators 512.

The percussion sound generators 512 are controlled by the same frequency generator(s) 370 as the nonpercussion generators, a percussion-drive signal 208 to be described next, and the peak-speed signal 209, which is the output of the peak-speed detector 207.

The percussion-drive signal 208 is the signal that initiates the percussion sound generation and occurs at the output of the drive pulse OR gate 210. The time derivative 218 of the busy-gate signal 55 and the time derivative 212 of a sawtooth voltage-controlled oscillator 213 are applied to the inputs to this gate. The voltage-controlled oscillator 213 is controlled by a dead-zone amplifier 214, which is, in turn, driven by the force signal 163. The dead-zone amplifier 214 is biased so that the amplifier output 215 is zero and the voltage-controlled oscillator 213 does not oscillate if the force of depression of a note 22 is less than a preset amount. When the force of depression exceeds the preset value, the dead-zone amplifier 214 will produce a signal related to the force 163, resulting in a frequency of oscillation of the voltage-controlled oscillator 213 that is related to the force 163. The sawtooth output 216 of the oscillator 213, when differentiated 217, produces a pulse for each cycle of the oscillator 213, which then appears on the percussion drive line 208 via the drive pulse OR gate 210. The pulse 218 derived from the differentiation 211 of the busy gate 55 appears on the percussion drive line 208 as soon as the note associated with the relevant tone generator 80 is struck. Each percussion drive signal 208 causes a "restrike" in the active precussion sound generator 512. Thus, the sound of drum rolls, and so forth may be generated and controlled by the force of note 22 depression. If the force on the note 22 depressed is less than the preset value, then a single strike of a percussion sound is generated.

Figure 7:
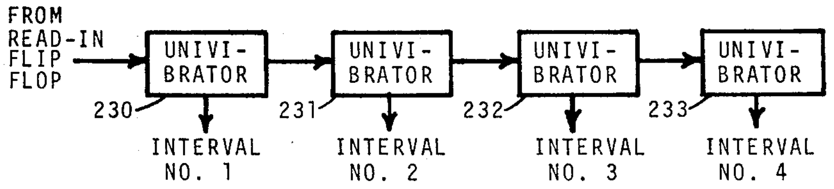
FIG. 7 is a block diagram of the multivibrator chain used to sequence the scanner through its various states if a note is depressed.

FIG. 7 is a block diagram of the note-depressed multivibrator chain. It consists simply of four univibrators 230, 231, 232, and 233 each sequentially triggered by the previous one, the first being triggered by the read-in flip flop 137. Each univibrator 230 through 233 is trailing edge triggered.

Figure 8:
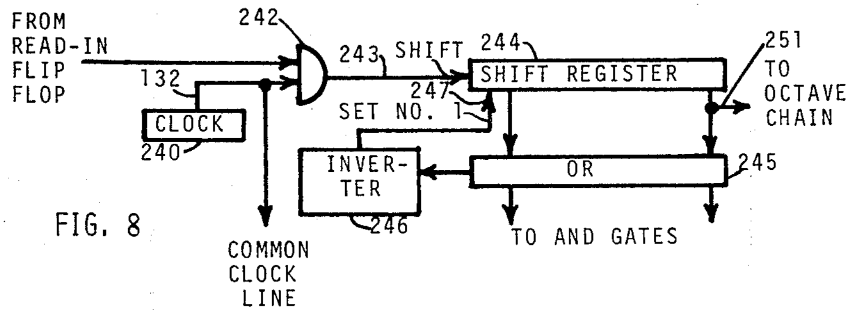
FIG. 8 is a block diagram of the multivibrator chain that defines the note within an octave.
Figure 9:
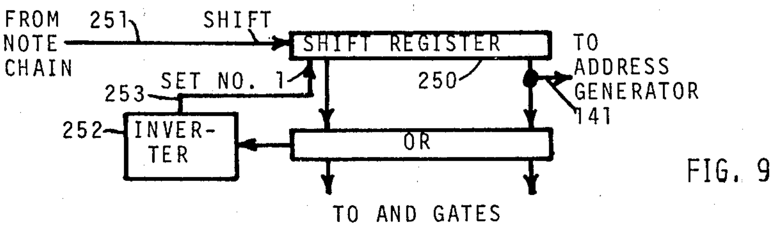
FIG. 9 is a block diagram of the multivibrator chain that defines the octave at which a note sounds.

FIGS. 8 and 9 are block diagrams of the note- 130 and octave-multivibrator 131 chains. Shift registers are used to implement these chains.

The note-multivibrator chain 130 consists of a clock 240, which provides a common clock signal 132, and the read-in flip flop 137 driving an AND gate 242 the output 243 of which drives the shift input of the shift register 244. All outputs of the shift register 244 are OR'ed 245 together, so that whenever all bits stored in the register 244 have been shifted off the end, the OR gate 245 goes OFF, turning ON the inverter 246, which the OR gate 245 drives. This inverter 246 is connected to the set input 247 of the first stage of the shift register 244, which sets the first stage of the shift register 244 when it goes ON, which, in turn, turns OFF the OR gate 245. Thus, this register 244 is self-starting and contains a single bit that propagates down the register 244. When a note 22 is found depressed, the note-multivibrator chain 130 is prevented from advancing by the read-in flip flop 137 via the AND gate 242.

The octave-multivibrator chain 131 is the same as the note-multivibrator chain 130, except that the shift register 250 is driven by the last stage 251 of the note-multivibrator chain 130, instead of the output 243 of an AND gate 242. Thus, the octave-multivibrator chain 131 is also prevented from advancing when a note 22 is found depressed. The last output 141 element of the octave-multivibrator chain 131 is not used to generate an octave address, but rather to reset the address generator 139 in preparation for another scanning of the notes 22 and for resetting address registers, as described in connection with FIG. 3.

Figure 10:
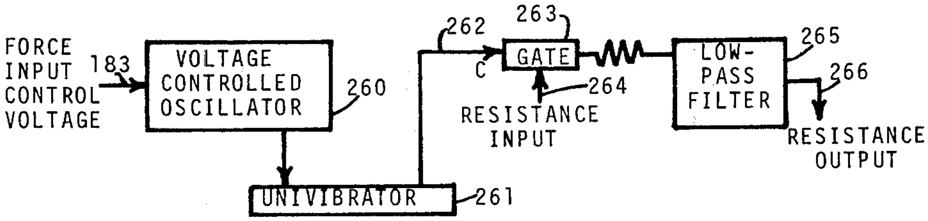
FIG. 10 is a block diagram of a precision voltage-controlled resistor.

FIG. 10 is a block diagram of a voltage-controlled resistor 177. This circuit 177 provides an effective conductance precisely proportional to the voltage 183 applied to it. The input control voltage 183 drives a voltage-controlled oscillator 260 the frequency of which is proportional to the input control voltage 183. The frequency of the voltage-controlled oscillator 260 is much greater than any frequency components contained in the input signal to the voltage-controlled resistor circuit 177. The voltage-controlled oscillator 260 drives a univibrator 261, which produces an output pulse 262 of constant width for each cycle of the voltage-controlled oscillator 260. Thus, the duty cycle of the univibrator pulse 262 is proportional to the input control voltage 183. The univibrator output 262 controls an analog gate 263, such as a field-effect transistor with its gate connected to the univibrator 261. The drain of the field-effect transistor is then connected to the input signal 264, and the source of the field-effect transistor is connected to a low-pass, resistor-operating filter 265. The effective conductance between the input 264 and the output 266 is then proportional to the actual conductance multiplied by the duty cycle of the univibrator pulse 262, which is, in turn, proportional to the input control potential 183.

Figure 11:
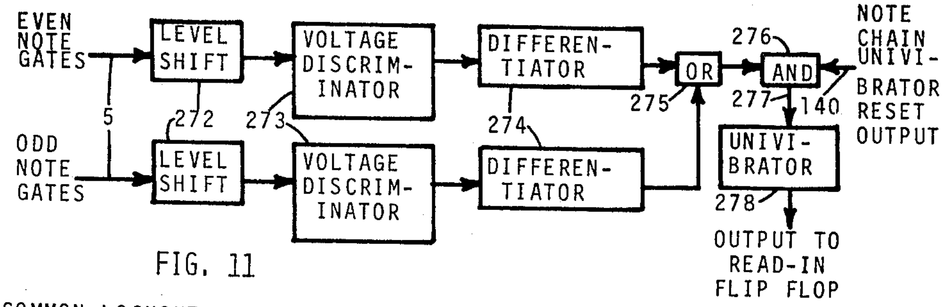
FIG. 11 is a block diagram of a detector that determines whether or not a note is depressed.

FIG. 11 is a block diagram of the note-depressed detector 6. This detector 6 is provided with two inputs 5, one for even note gate outputs 5 and one for odd note gate outputs 5. Each gate is suitably shifted in level 272 by a zener diode and applied to an emitter follower. The output of the emitter follower excites a voltage discriminator 273, consisting here merely of a normal transistor amplifier with grounded emitter (hence, the level adjustments with the zener diodes earlier in the circuit). The output of each voltage discriminator 273 is differentiated 274 by a suitable resistor and capacitor. The differentiator-output pulses from the even and odd gates 5 are OR'ed 275 together. The output of the OR gate 275 is AND'ed 276 with the reset output 140 of the note-chain univibrator 133. The output of the AND gate 276 is applied to a pulse-generating univibrator 278. Thus, if the transition applied to the note-depressed detector 6 rises so slowly that the time at which it passes through the discriminator-threshold level is after the termination of the note-chain univibrator 133 reset pulse 140, the pulse output 140 of the differentiators 274 will not be inhibited by the note-chain-univibrator 133 reset pulse 140, and a pulse will occur in the AND gate 276 output, triggering the output univibrator 278.

Figure 12:
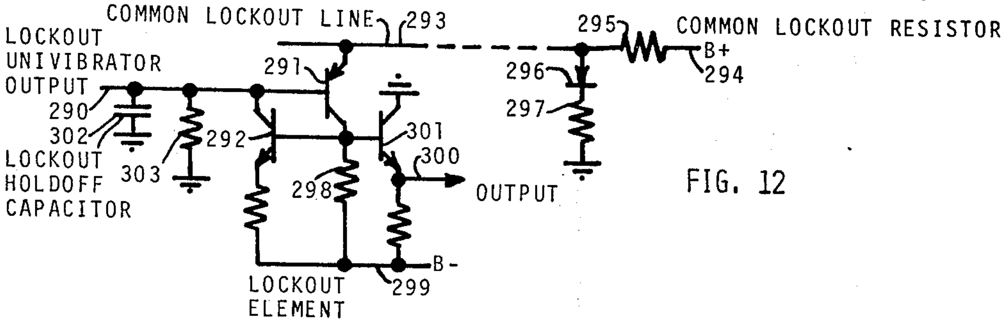
FIG. 12 is a schematic diagram of the lockout circuit.

FIG. 12 is a schematic diagram of the lockout circuit 153 that is used to initiate the association of a depressed note 22 with a selected control unit 64. There are two states for each lockout element: conducting and nonconducting. The input-drive signal 290 is applied to the base of the drive transistor 291; the collector of the latch transistor 292 is also connected to the base of the drive transistor 291. The emitter of the drive transistor 291 is connected to a lockout line 293 common to the emitters of the drive transistors 291 of all lockout elements 153. The lockout line 293 is connected to the lockout current source 154, which may be a first supply potential 294 applied to a common load resistor 295. In addition, the lockout line 293 is clamped near ground in potential by a diode 296 and a resistor 297 in series, one of which is connected to ground. The collector of the drive transistor 291 is connected to the base of the latch transistor 292 and to a resistor 298, the other end of which is connected to a second potential 299. The latch 292 and drive 291 transistors are of opposite types; the latch transistor 292 causes the drive transistor 291 to be either fully conducting or completely nonconducting. The output 300 of the lockout element 153 is taken from an emitter follower 301 connected to the collector of the drive transistor 291. A capacitor 302 and resistor 303 are connected in shunt across the input 290 to the lockout element 153 and ground.

The biases on the transistors in a lockout element 153 are such that, if the potential 290 across the input capacitor 302 is zero (or of small magnitude), the transistors will conduct when the diode 296 between the lockout line 293 and the resistor 297 to ground is forward biased, but will not conduct when any other lockout element 153 connected to the common line 293 is conducting, because of the drop in potential, caused by this element, across the common lockout resistor 295. The conducting state corresponds to the ready-idle state. The reserve-idle and busy states for a lockout element 153 differ only in the potential 290 across the holdoff capacitor 302 at the input to the lockout element 153. In the busy state, the potential 290 across the holdoff capacitor 302 is of sufficient magnitude that the lockout element 153 will not become conducting even if the maximum potential is applied to the emitter of the drive transistor 291. The potentials across the input capacitors 302 of lockout elements 153 in the reserve-idle state are sufficiently small in magnitude that, if the component of current through the common lockout resistor 295 due to all lockout elements 153 momentarily vanishes, one of the lockout drive transistors 291 in the reserve-idle state will become conducting. The potential of the common lockout line 293 is clamped to prevent a lockout element 153 in the busy state from becoming conducting even when all lockout elements 153 are in the busy state. In this case, the clamp diode 296 and resistor 297 bypass the current normally conducted by the ready lockout element 153 to ground.

As soon as a note 22 is depressed, the lockout univibrator 166 generates a pulse for each scan of the notes 22. On each of these scans, the univibrator 166 charges the capacitor 302 at the input 290 to the lockout element 153 associated with that note 22 to a definite potential (by being in the control unit 64 that stores the address of that note 22). This potential 290 across the capacitor 302 is sufficient to bias this element into the nonconducting state. At this point, the current through the common resistor 295 between the first supply potential 294 and the lockout line 293 momentarily vanishes. Another lockout element 153 suddenly transfers to the conducting, ready-idle state, preventing any other lockout element 153 from transferring to this state.

If all control units 64 are busy, the depression of a further note 22 will cause nothing to happen. However, just as soon as one of the other notes 22 is released, the potential 290 across the capacitor 302 at the input of the associated lockout element 153 drifts to the maximum potential applied to the emitter of the drive transistor 291, and the lockout element 153 goes into the reserve-ready, and then immediately into the busy states, when it becomes associated with the newly depressed note 22.

Figure 13:
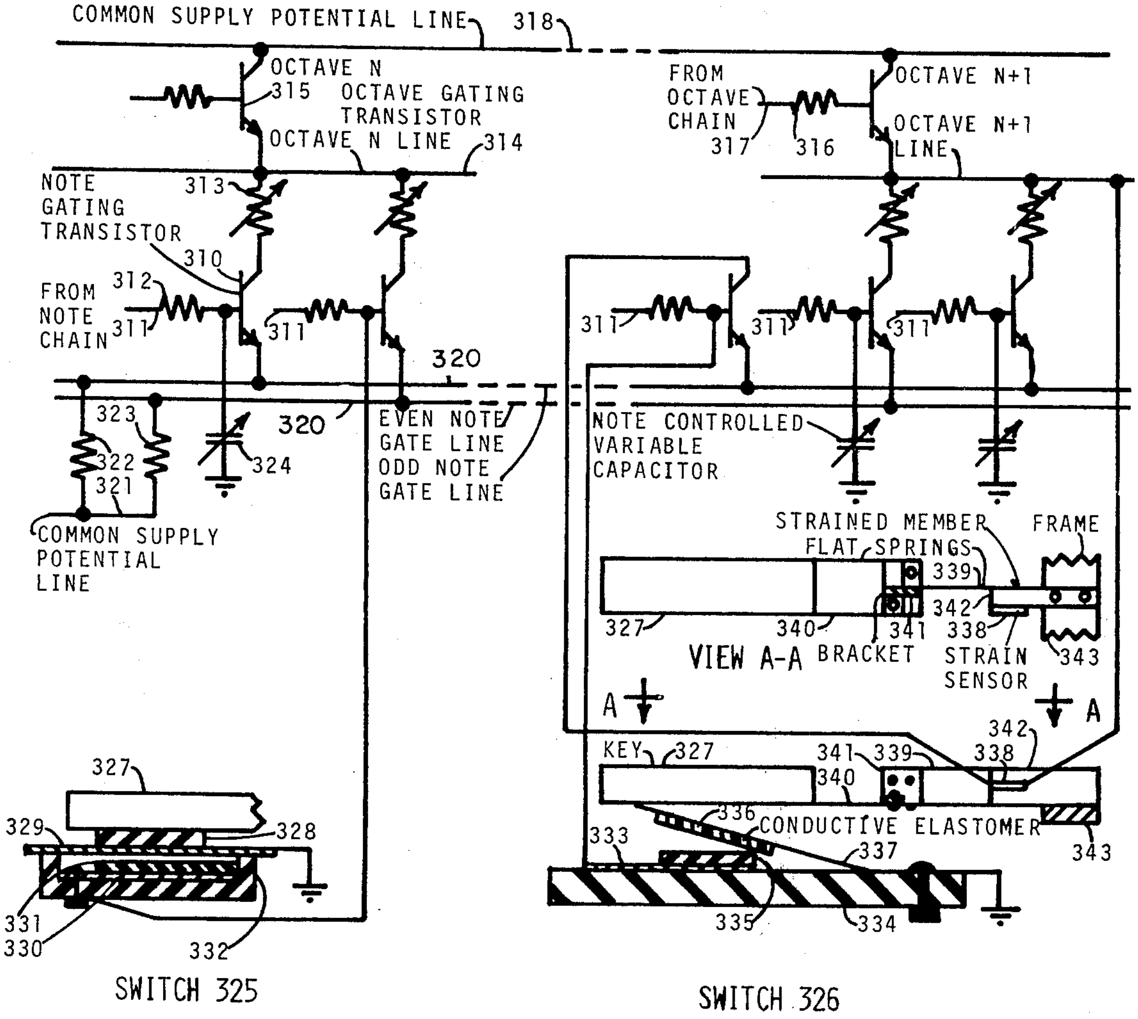
FIG. 13 is a schematic diagram of a means for keying each note and a mechanical diagram of two versions of the note "switches".

FIG. 13 is a diagram of the preferred circuitry and keying mechanisms associated with the notes 22. Preferably, there is a transistor 310 for each note 22 in the instrument. Each output 311 from the note chain 130 is connected through a resistor 312 to the base of a suitable one of these note-gating transistors 310. The collector of each note-gate transistor 310 is connected through a variable resistor 313 to a line 314 common to all transistors 310 in a particular octave. Each of these common lines 314, one for each octave, is connected to the emitter of an octave-gate transistor 315. The base of each of these octave-gate transistors 315 is connected through a resistor 316 to a suitable output 317 of the octave chain 131. The collector of each of these octave-gate transistors 315 is connected to a suitable supply potential 318. The emitters of all even-numbered note-gate transistors 310 are OR'ed together by being connected in common 5; likewise, the emitters of all odd-numbered note-gate transistors 310 are OR'ed together by being connected together in common 5. Each such common line 5 is connected to a second supply potential 321 through a load resistor 322 or 323, which is large compared with the maximum value of the collector resistors 313. An assertion pulse from the octave chain 131 and an assertion pulse from the note chain 130 turn ON one and only one note-gating transistor 130. Thus, a particular note 22 is selected. The note-gate transistor 310 is turned ON sufficiently hard so that the collector and emitter potentials are essentially the same. The collector series resistance is small compared with the base resistance so that any base current flowing into the transistor will not substantially affect the emitter-collector potential.

The variable resistance 313 connected in series with the collector may be controlled by the sidewise motion of the associated note 22 and is used as one of the elements to define, e.g., to perturb, the frequency of a note 22. The variable resistance 313 may be a wire wound, conductive plastic, a film type of potentiometer strip, a strain gauge wire, a semiconductor strain gauge, a silicon semiconductor strain sensor, or a variable resistance conductive elastomer.

A variable capacitor 324 is connected between the base of each note-gating transistor 310 and ground. The value of this capacitor 324 is controlled by the same note 22 that varies the corresponding series collector impedance 313. The capacitance may be the greater, the greater the force with which the note 22 is depressed. Because of the resistor 312 in the base of the note-gating transistor 310, the note-gating transistor 310 emitter 320 rises slower than the note-chain 130 drive signal 311 and at a rate related to the force with which the note 22 is depressed whenever that note-gating transistor 310 has an assertion on its base and collector terminals, i.e, when this particular note 22 is selected for examination by the note- 130 and octave-multivibrator 131 chains. In other words, the resistor 312 and capacitor 324 connected to the base of the note-gating transistor 310 define a time constant that determines the speed of change of the potential at this transistor base. The emitters 328 of the even-numbered note-gating transistors 310 are connected together and the emitters 320 of the odd-numbered note-gating transistors are connected together so that the delay in the change from the assertive state on the common line to the negation state caused by the base-to-ground capacitance 324 of the transistor 310 will not mask the change to the assertion state of the neighboring transistor 310 when the transistor is changed to this state. (If, contrary to the present scheme, all note-gating transistor 310 emitters were connected to a single common line, then this line would remain in the assertion state when two neighboring transistors are put into this state in sequence.)

FIG. 13 also displays mechanical diagrams of two switches 325 and 326 providing the variable capacitors 324 associated with two notes 22, as mentioned previously. Both note switches 325 and 326 are noncontacting, capactive types. In each case, as the note 22 is depressed, the capacitance between two metallic members is increased. In the case of switch 325, the note channel 327, a stiff member, bears against an elastomer 328 that rests on a thin metallic, flat spring 329 connected to ground. The flat spring 329 is spaced away from another parallel strip 330 of metal, which is connected to the note-gating transistor base 310. A thin insulator 331, preferably of high dielectric constant, lies on top of this strip of metal 330. This strip 330 rests on the bottom of a very shallow U channel 332, the two ends of which support the flat spring 329 depressed by the note 22. Thus, as the force on the note 22 is increased, the spacing between two metallic members 329 and 330 decreases, increasing the capacitance.

In the case of switch 326, which is preferred, a flat strip of metal 333 connected to the note-gating transistor 310 base rests on a flat sheet of insulating material 334. A thin strip 335 of high dielectric constant, insulating material rests on top of the flat strip of metal 333. A strip of conducting elastomer 336 is conductively bonded to a flat, grounded, conducting, metallic spring 337. By depressing this spring 337, the conductive elastomer 336 is brought to bear along one side of the high dielectric constant material 335. Thus, as the force on the flat spring 337 is increased, the spacing decreases, the contact area between the elastomer 336 and the high dielectric-constant material 335 increases, and the capacitance increases. The thin, high dielectric-constant insulator 335 greatly enhances the capacitance over that achieved with similar spacing using a low dielectric-constant insulator, such as air. The conductive elastomer 336 serves to remove any air spacing between the flat spring surface 337 and the top surface of the high dielectric-constant insulator 335, and, thereby, greatly increases the tolerances with which the insulator 335 and the spring 337 can be made.

By suitably proportioning all dimensions, the displacement of the note 22 to vary the capacitance 324 through its full range can be made very small. The note then feels sensitive to the force exerted on it, the concomitant displacement being unnoticed by the player. (By proportioning all dimensions differently, the displacement of the note to work the variable capacitor 324 through its full range can be made very large. The note is then displacement sensitive so far as the player is concerned. Experience indicates that this scheme is not preferred by players for the musical situations so far explored.) The ungrounded metallic strip 330 or 333 in each capacitive switch is connected to the base of a corresponding transistor 310.

FIG. 13 also contains a drawing of the mounting mechanism for a typical key or pedal. Such a mounting mechanism must satisfy a number of requirements:

1. It must be compatible with the capacitive switching schemes shown in switch 325 and switch 326.

2. The note must be capable of moving in two orthogonal directions without looseness.

3. The strain sensors 338 must not break when the note is subjected to reasonably unusual forces, yet, the sensitivity must be great enough that an adequate signal-to-noise ratio is obtained and that amplification is minimal.

The mechanism shown in FIG. 13 satisfies all the above requirements. It consists of two flat springs 339 and 340 mounted orthogonally with respect to each other by means of a bracket 341 to which they are secured. The first flat spring 340 carries the key 327 or pedal 327 proper. The second spring 339 is affixed to one end of a mounting block 342. The other end of this block 342 is secured to the frame 343 of the instrument. A strain sensor 338 is affixed to the mounting block 342 end to which the second flat spring 339 is secured. The strain sensor 338 is preferably a silicon semiconductor strain element, although strain gauge wire, ceramic semiconductor strain gauges, and the like may be used. The flat springs 339 and 340 are of a thickness such that the desired force is obtained in moving the note 22, viz., in the order of a newton for a key. The end of the mounting block 342 to which the second flat spring 339 is secured is so proportioned that its strain for a fully deflected note 22 is sufficient to give a substantial output from the strain transducer 338, yet sufficiently small that the strain sensor 338 will be well within the limit of its breaking force when the note 22 is subjected to an unusually great force. In particular, the mounting block 342 and second spring 339 can be so designed that a sidewise force of 1 newton yields a displacement of 1 mm, a force of 0.1 millinewton being then exerted on the strain sensor 338. At the resulting strain, a simple external circuit can be so designed to produce over a volt change using a semiconductor strain element. If the note 22 is now subjected to a large sidewise force, a displacemet of 2 mm results before the note 22 encounters a rigid vertical guiding element, and this element prevents any further substantial deflection; the resulting force on the sensor will then be 0.2 millinewton, well within the breaking force limit of the silicon semiconductor sensor. Thus, a sidewise force on the key 327 strains the sensor 338 changing its resistance, and thus altering the resistance in series with the collector of the note-gating transistor 310. The bottom of the note 22 near the end on which the player performs forms the stiff note-channel 327 member of switch 325 or is used to depress the flat spring 337 forming the variable capacitor in switch 326.

Touch sensitive keying, i.e., keying involving no displacement at all, may be achieved with switches similar to either switch 325 or switch 326 simply by removing the top flexible metallic members 329 or 337. If the finger touches the top of the insulating layers 331 or 335 in either switch 325 or switch 326 there will be a capacitance to ground at the base of the note-gating transistor 310 via the usual body capacitance to ground. Furthermore, the capacitance will be the greater, the greater the force of depression of the finger against the insulating layer since the area of contact of the finger against the insulating layer will increase with increased applied finger force.

Figure 14:
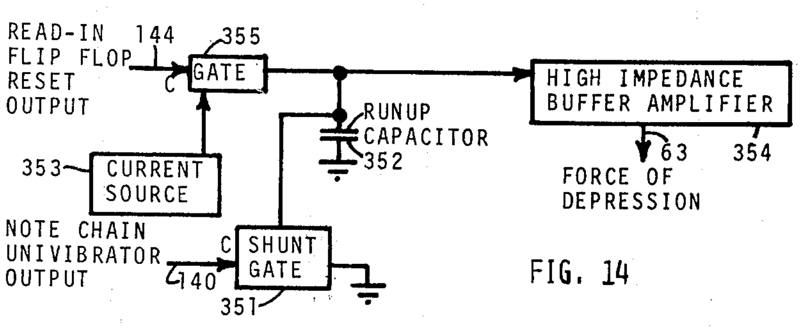
FIG. 14 is a block diagram of the circuit used to compute the force with which a note is held depressed.

FIG. 14 is a block diagram of the circuits used to generate a potential 63 related to the force with which a note 22 is depressed. The pulse 140 from the note-chain univibrator 133 closes a shunt gate 351 across a runup capacitor 352, thus resetting the runup capacitor 352 for a new calculation. The instant the pulse 140 ends is used as the fiducial point for the calculation of the force with which a note 22 is depressed. This force is related to the time between the fall of the univibrator 133 pulse 140 and the start of the read-in flip flop gate 137. During this period, charge flows into the runup capacitor 352 at a constant rate from the constant current source. The gate 355 driven by the flip flop 137 interrupts the current from the constant current source 353, thereby holding the potential across the runup capacitor 352 constant during the time the note is being examined by the scanner system 101. The potential of the runup capacitor 352 thus increases during the time between the end of the note-chain univibrator 133 pulse 140 and the triggering of the read-in flip flop 137, a time related to the capacitance 324 at the base of the note-gating transistor 310. A Darlington-connected, emitter-follower amplifier 354 at the output of the runup capacitor 352 provides a sufficiently high impedance to prevent capacitor drain.

Figure 15:
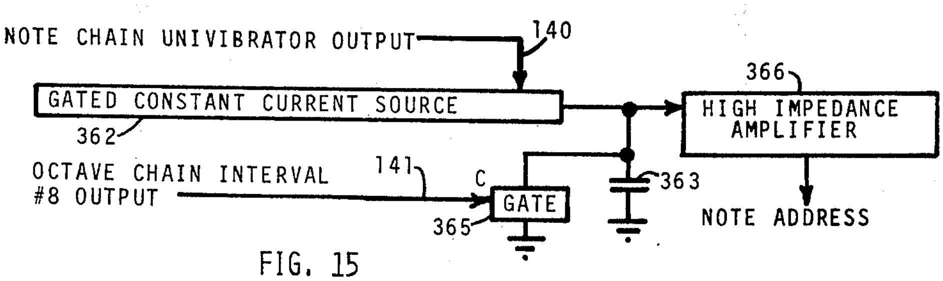
FIG. 15 is a block diagram of the circuit used in each tone generator to generate the address of the note associated with the tone generator.

FIG. 15 is a block diagram of the note address generating circuit. The output 140 of the note chain univibrator 133 gates a constant current source 362 (emitter follower with load in the collector line) ON for the duration of the univibrator 133 pulse 140, thus charging up a capacitor 363 by a definite amount for each pulse 140. During interval 8, 141, of the octave chain 131, a gate 365 connected in shunt across the capacitor 363 discharges that capacitor 363 in preparation for the next scan. A high input impedance amplifier 366 buffers the capacitor potential.

FIGS. 16, 17, and 18 are block diagrams of three types of frequency generators and associated circuitry. The frequency generator 370 proper in these figures is an oscillator and may be a voltage-controlled oscillator, such as a standard unijunction transistor relaxation oscillator in which a current proportional to the control potential charges a runup capacitor. The output 460 of the frequency generator 370, which may be a short, repetitive pulse, a triangular wave, a sawtooth wave, a sine wave, a square wave, or a combination of these, excites the sound generators 103 and a frequency signal AND gae 371, the second input to which is the busy gate 55. The output of this AND gate 371 is then a signal identical to the signal of the frequency generator 370, but lasting only for the duration of the busy gate 55. The preferred output signal from the frequency generator 370 is a short, repetitive pulse, which will be assumed in the descriptions of the sound generators 103.

FIG. 16 displays frequency generating apparatus in which separate voltage-controlled oscillators 370 are used for each sound generator 103. These frequency generators 370 are individually modulated by signals comprising the FM control signal 190 and frequency modulation functions 372 appropriate to the individual sound generators 103. These frequency modulation signals are coupled to the voltage-controlled oscillators 370 via the coupling networks 373 shown. A suitable coupling network 373 may be found in F. A. Korn & T. M. Korn, ELECTRONIC ANALOG & HYBRID COMPUTERS, pp. 1–9, FIG. 1–6c (McGraw-Hill, New York 1964). These networks 373 couple the appropriate amounts of the input signals into the frequency generator 370. This method of producing the frequency signals for the sound generators provides the maximum "separation" of the sound ultimately produced by the various sound generators 103, because the various waveforms produced by the generators are not phase locked.

FIG. 17 shows frequency generating apparatus that includes only a single frequency generator 370 the output of which is then pulse delay modulated by coupling circuits similarly to those used in FIG. 16. This type of modulation is a special type of phase modulation, and a suitable modulator 374 is shown in more detail in FIG. 19. This method of frequency generation gives a common center frequency to all the sound generators 103 associated with this tone generator 80, but allows independent frequency modulation of the frequency signals for each sound generator 103.

FIG. 18 shows frequency generating apparatus consisting of a single frequency generator 370 with a single frequency modulation input control. The FM control signal 190 from the control unit 64 and from the various active sound generators 103 are merely added together in the coupling circuits 373 to achieve a single frequency modulation signal 375. This method is simplest and least expensive to implement, but does not give the full effect of different instrument playing the same note at the same time, since the frequency signals provided to the various sound generators 103 are phase locked.

Figure 19:
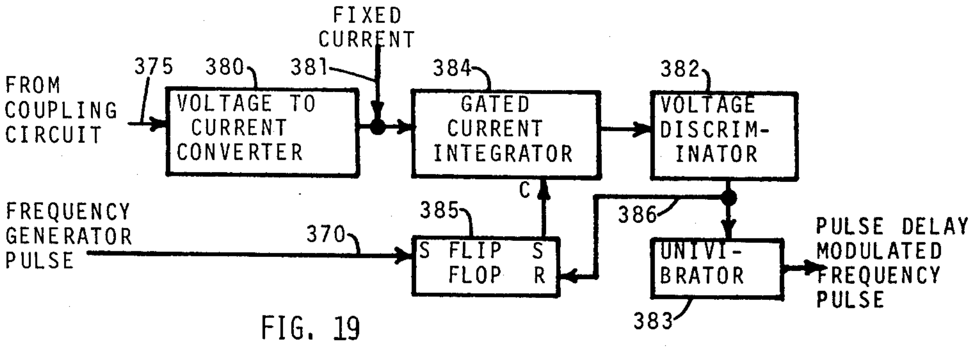
FIG. 19 is a block diagram of the pulse delay modulator used in one of the frequency generators.

FIG. 19 is a block diagram of a pulse delay modulator 374. A current generated by the converter 380 proportional to the composite FM-control signal 375 created by the coupling circuits 373 (see FIG. 17) plus a fixed current 381 is integrated for a period not longer than that of the frequency generator 370 exciting the pulse delay modulator 374. Converter 380 provides a current proportional to the voltage at its input and may comprise a pentode electron tube, the collector of an emitter follower, field effect transistors operated on the flat part of their characteristic curves or other suitable voltage-to-current converters, such as shown in APPLICATIONS MANUAL FOR COMPUTING AMPLIFIERS, pp. 67–79 (George A. Philbrick Researchers, Inc. 1966). A voltage discriminator 382, such as described on page 58 of the aforesaid Philbrick Manual, at the output of the integrator triggers a univibrator 383 when the integral reaches a preset level. Thus, the period between pulses of the univibrator 383 is modulated by the composite FM-control signal 375, since the instant the integrator reaches the preset level is so modulated. The composite FM-control signal 375 is converted to a current, which is then added to a fixed current 381. The sum is integrated 384 until the voltage discriminator 382 triggers. The voltage discriminator 382 resets a flip flop 385 that resets the integrator 384 to zero and holds it there until the next pulse arrives from the frequency generator 370. This pulse 370 sets the flip flop 385, at which instant the integration 384 starts all over again.

FIG. 20 is a diagram of the note-frequency digital-to-analog converter 143. This converter 143 consists of two parts: one (note part) associated with the note chain 130 and one (octave part) associated with the octave chain 131. The two parts are connected in tandem. Each part consists of a suitable chain of precision resistors 390 through 395 connected in series. The gates 396 through 398, which may be field-effect transistors, in the note part are controlled by the output of a respective element in the note chain 130. The source of each field-effect transistor is connected to a respective junction between two precision resistors in the note part. These field-effect transistors thus act as voltage sources; only one is switched ON at a time. The drains of these field-effect transistors are connected together at the input 402 of an impedance buffering amplifier 403, used as a voltage follower. The output 404 of this amplifier 403 excites a precision resistor-divider chain 393 through 395 associated with the octave-multivibrator chain 131. The octave part is constructed and operates exactly similarly to the note part. However, the potential 404 for one end of this chain 393 through 395 is derived from the potential provided at the output of the voltage follower 403 used in the note part. Thus, the octave signal multiplies the note potential 404 and provides the appropriate voltage signal 405 for the note frequency. By appropriate choice of the resistors 393 through 398 stretched scales may be provided.

The instrument can be tuned by adjusting the tuning control 145, which varies the potential 147 that drives the note chain. Despote the change of tuning, the musical intervals remain in their proper relation because they are defined by the ratios of potentials and these are specified by ratios of resistors the values of which do not change when the potential applied is altered.

Figure 21:
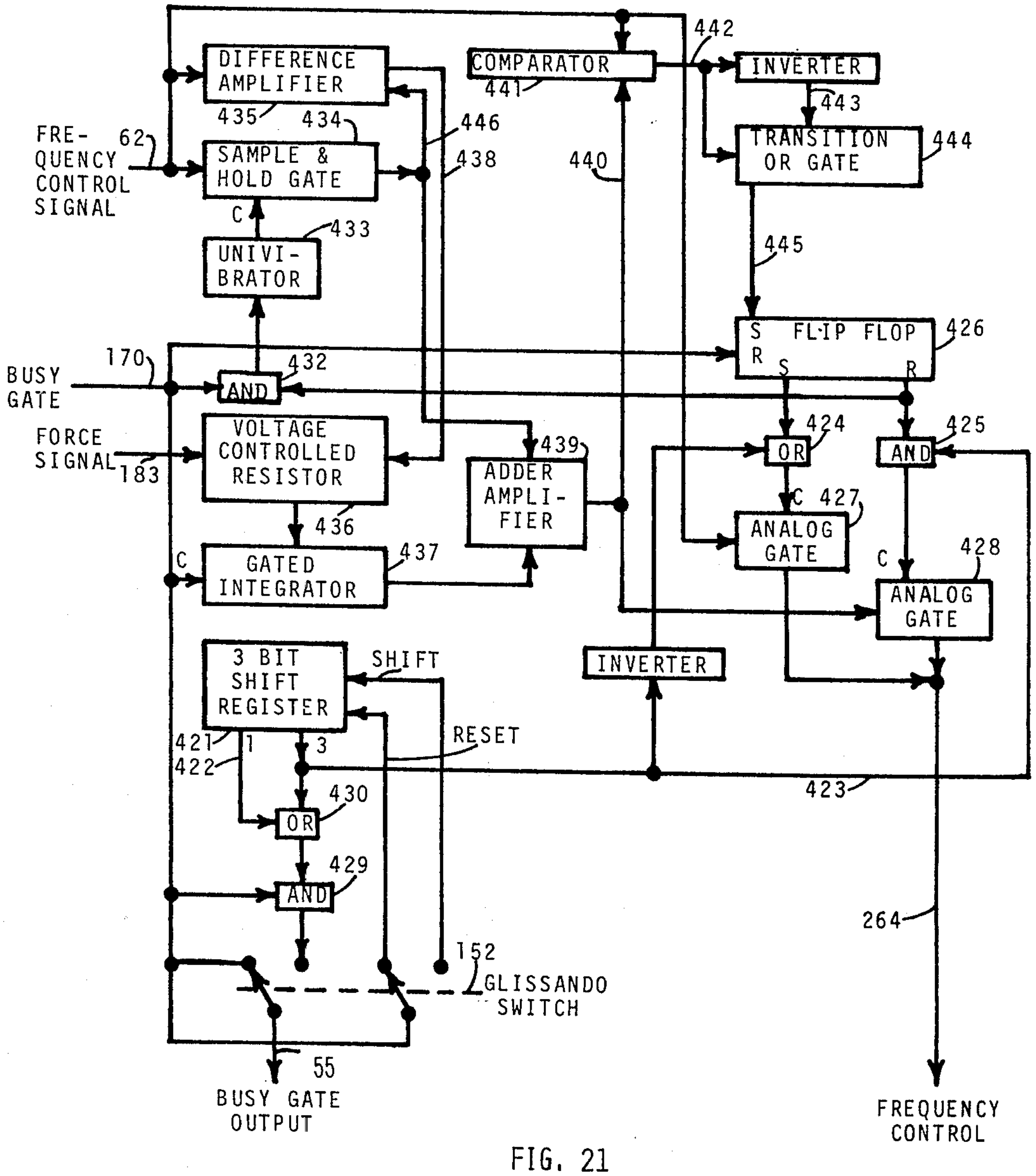
FIG. 21 is a block diagram of a second means for providing a glissando capability.

FIG. 21 is a block diagram of the second circuit for achieving a glissando, which requires only a single control unit. This circuit uses the previous frequency-control potential that appears on line 62 and the present frequency control potential that appears on the same line 62 to generate a third potential that starts at the previous potential and moves linearly towards the present one. The rate of change with time of this potential may be controlled by the force 183 with which the present note is depressed, so that in a strict sense, the final potential changes linearly only if the note 22 is depressed with a fixed force.

The discrete-glissando switch 152 determines whether or not the present glissando circuit 182 is in use. As shown, it is not, and the instrument is in the discrete frequency mode. In the discrete mode, the busy-gate signal 170 is directly coupled to the sound generators 103 via line 55. In this mode, the busy gate 170 resets a three stage shift register 421 to its first state 422, turning OFF the output of the third stage 423. Shift registers and how to reset them are well-known in the art. See for example, DIGITAL FLIP CHIP MODULES, pp. 25–26 (Digital Equipment Corp., Maynard, Mass. Feb. 1965); THE DIGITAL LOGIC HANDBOOK FLIP CHIP MODULES, pp. 61–63, 99, 335–36 (Digital Equipment Corp. 1968); DIGITAL COMPUTER LAB WORKBOOK, pp. 40–42 (Digital Equipment Corp. 1969). This condition of the shift register 421 forces the output of a first OR gate 424 and a first AND gate 425, which are connected to the set and reset outputs of the control flip flop 426, to be ON and OFF, respectively. These conditions turn ON and OFF, respectively, the analog gates 427 and 428, the inputs of which are connected directly to the input frequency control line 62 and the glissando frequency control line 440. The frequency of the output signal 264 in this case is then essentially a directly coupled version of the input frequency-control signal 62.

The glissando mode is activated by actuating the discrete-glissando switch 152 to the position other than that shown. The busy-gate output signal 431 is now the output from a second AND gate 429, which is, in turn, driven by a second OR gate 430. The inputs to this second OR gate 430 are the outputs of the first 422 and third 423 stages of the three stage shift register 421. This gating sequence turns OFF the busy-gate output 431 when the second stage of the shift register 421 is ON. Assume now that a sequence of three notes is to be played in which the first note is to be played at a discrete, fixed frequency followed by a glissando between the second and third notes. In this case, the first note is played with the glissando switch 152 in the position shown, i.e., discrete. Sometime before the depression of the second note and after the depression of the first note, the glissando switch 152 is actuated to the position not shown. Since the first stage 422 of the shift register 421 is still ON, the busy-gate signal 431 will stay ON. The third stage 423 of the shift register 421 will be OFF, thereby transmitting the first frequency-control signal to the output frequency control line 264, as previously described. Release of the first note and depression of the second note will advance the shift register 421 turning ON the second stage. The busy-gate output signal 431 turns OFF, and, thus, no sound will be produced by the sound generators 103 attached to this control unit 64. Release of the second note and depression of a third note will advance the shift register 421 again turning ON the third stage 423 of the shift register 421. The generation of the glissando frequency-control potential now begins.

The trailing edge of each busy-gate signal 170 causes the input frequency signal to be sampled and held by means of a third AND gate 432 and a trailing edge triggered univibrator 433 driving a sample-and-hold gate 434. Following the next turn ON of the busy gate 170, both the previous value of the frequency-control signal stored in the sample-and-hold gate 434 and the present value of the frequency-control signal 62 are applied to a difference amplifier 435, the output of which drives a voltage-controlled resistor 436, which, in turn, is connected to a gated integrator 437. The gated integrator 437 integrates a current that is proportional to the product of the potential 438 produced by the difference amplifier 435 and the conductance of the voltage-controlled resistor 436. The gated integrator 437 is switched by the input busy-gate signal 170 that resets the value of the integrator 437 to zero when the busy-gate signal 170 is ON. The output of the integrator 437 is added to the previous frequency-control potential 446 stored in the sample-and-hold gate 434 by a linear adder 439. The output potential 440 of this adder 439 then starts at the potential of the previous frequency-control signal 446 at the start of the busy-gate signal 170 and changes in a manner so as to approach the value of the present frequency-control signal 62 at a rate determined by the difference of the present and previous frequency-control signals, and the voltage-controlled resistor 436, which is, in turn, controlled by the force 183 with which the present note 22 is depressed. The output 440 of the adder 439 is gated onto the frequency-control output signal line 264 by the flip-flop controlled 426 analog gate 428, which is in the reset state by virtue of the application of the busy-gate signal 170 to the reset input of the flip flop 426. The flip-flop 426 set and reset outputs are applied to the first OR 424 and the first AND 425 gates, respectively, which are controlled by the inverted and normal outputs of the third stage 423 of the shift register 421, respectively. Since this third stage 423 is now ON, the output of the first AND 425 and first OR 424 gates are identical to the outputs of the flip flop 426. The OR gate 424 controls the analog gate 427 between the input 62 and output 264 frequency-control-signal lines, and the AND gate 425 controls the analog gate 428 between the output 440 of the linear adder 439 and the output 264 frequency-control line.

The output 440 of the adder 439 and the present input frequency-control signal 62 are applied to a comparator 441 that produces a fast transition in output level when the applied input signals 62 and 440 become equal, i.e. at the time when the glissando signal 440 becomes equal to the present value of the input frequency-control signal 62. The comparator output 442 and its inversion 443 are applied to a transition OR gate 444, which produces a pulse 445 whenever the above equality occurs. This pulse 445 is applied to the set input of the flip flop 426, which then changes the signal appearing on the output frequency-control line 264 from the glissando signal to the present value of the input frequency-control signal 62. The reset output of the flip flop 426 is connected to the third AND gate 432, which drives the univibrator 433, which, in turn, drives the sample-and-hold gate 434. Thus, when the flip flop 426 sets, the present input frequency-control signal 62 is stored in the "previous" value sample-and-hold gate 434. This updating of the "previous" value sample-and-hold gate 434 prepares the glissando circuitry for any successive glissandos.

A return to the discrete frequency mode is accomplished by returning the discrete-glissando switch 152 to the position displayed. If this switch 52 is returned to the discrete mode during a glissando, the circuitry continues to produce the glissando signal in the normal manner, since the basic control signal, i.e., the busy-gate signal 170, does not change state. Subsequent release of the note and depression of another resets the shift register 421 to its first state via the busy-gate signal 170 and connects the input frequency-control signal 62 to the output frequency-control line 264, as previously described.

Figure 22:
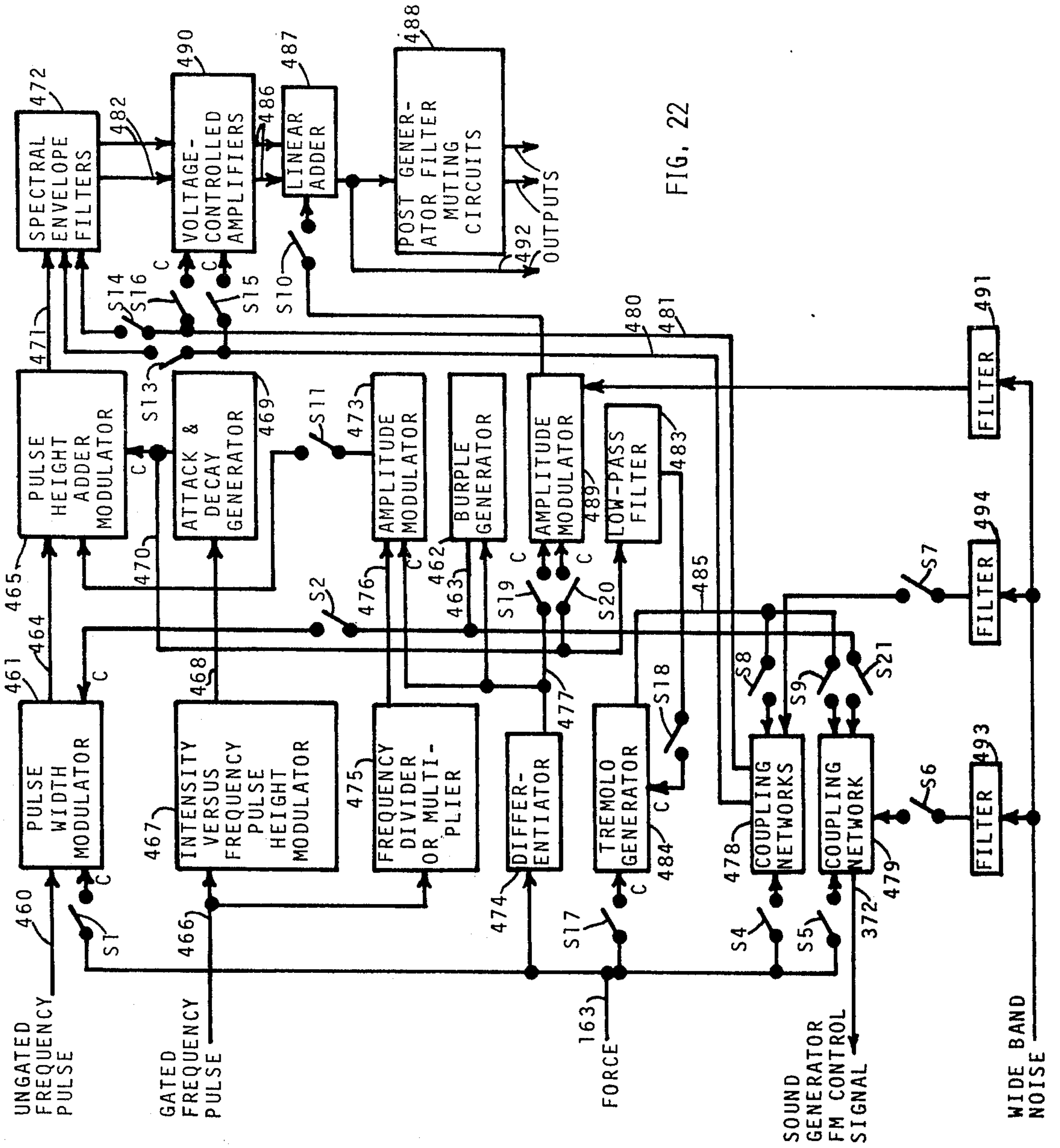
FIG. 22 is a block diagram of a generalized circuit used to create nonpercussive musical sounds.

FIG. 22 is a block diagram of a generalized sound generator that is used to create a variety of nonpercussive waveforms. By definition, such a waveform exists for and is controlled by the note 22 for the period of time that the note 22 is depressed that is associated with the particular tone 80 and sound 103 generators creating the waveform.

The ungated frequency pulses 460 excite a pulse-width modulator 461. This modulator 461 is controlled by the force signal 163 and/or the output of the burple generator 462, which are switched by S1 and S2. The force signal 163 from switch $S_1$ is statically coupled internally to the pulse-width modulator 461; the burple generator output 463 from switch S2 is dynamically coupled internally. The output 464 of the pulse-width modulator 461 is applied to the pulse-height-adder modulator 465. The latter are well-known in the art and may be any amplitude modulator or multiplier, for example, as shown in F. E. Terman, ELECTRONIC & RADIO ENGINEERING, Para. 18–10, FIGS. 1–31*c* (McGraw-Hill Book Co. 1955).

The gated frequency pulse 466 is applied to an intensity-versus-frequency-pulse-height modulator 467. The output pulses 468 from this modulator 467 are synchronous with the input pulses 466 applied, but are modified by this modulator 467 in height at the output 468 as the frequency of the applied pulses 466 changes. This modulator 467 consists of a standard frequency discriminator circuit to which the input pulse train 466 is applied. After suitable amplification to achieve the appropriate intensity versus frequency characteristics, the discriminator output is used to clamp the amplitude of a standard pulse amplifier, which provides the output 468 of the modulator 467.

The attack and decay generator 469 creates an attack and decay envelope signal 470 from the output of the intensity-versus-frequency-pulse-height modulator 467. A low-pass filter driving a standard peak detector is an example of such an attack and decay generator 469. If the time constant of the detector circuit is longer than the time constant of the low-pass filter, then the low-pass filter time constant will determine the duration of the attack, and the time constant of the detector will determine the time constant of the decay. If an attack duration dependent on the frequency of the input-pulse train 466 is desired, then the input-pulse train 466 may be applied to a resistor that, in turn, drives the detector. The duration of the attack will then depend on the duty cycle of the applied pulse train and the duration of the decay will depend on the time constant of the detector, as previously mentioned.

The attack-and-decay generator output 470 controls the pulse-height-adder modulator 465, the signal input of which is supplied by the output of the pulse-width modulator 461. This modulator 465 imposes the outputs of the intensity-versus-frequency modulator 467 and the attack-and-decay generator 469, which together comprise an envelope generator, on the ungated-and-pulse-width-modulated frequency pulse 464. For example, if switches S1 and S2 are closed, then the output 471 of the pulse-height-adder modulator 465 is a pulse train, the duty cycle of which is controlled by the force signal 163, the output 463 of the burple generator 462, the intensity-versus-frequency-pulse-height modulator 468, and the attack-and-decay generator 469. The output 471 of the pulse-height-adder modulator 465 is applied to the spectral envelope filters 472.

An additional pulse train is added via switch S11 to the pulse-height-adder modulator 465. This second pulse train comes from an amplitude modulator 473 that is controlled by the differentiator 474 and the signal input of which is the output of the frequency divider or multiplier 475. The repetition rate of this divider or multiplier 475, which is driven by the gated frequency pulse 466, is either an integral multiple or fraction of the fundamental frequency pulse input 466. This divided or multiplied signal 476 is modulated by the output 477 of the differentiator 474, so that, when switch S11 is closed, a burst of pulses at an integral multiple or fraction of the fundamental frequency is produced when there is a rapid variation in the force signal.

The burple generator 462 is driven by a differentiator 474, which is, in turn, driven by the force signal 163. The burple generator 462 creates an oscillating signal the magnitude of which is controlled by the differentiator 474. This oscillating signal may be coherent or incoherent, and it may contain audio and/or subaudio frequency components. The differentiator 474 may be a simple resistor-capacitor type the values of which may be chosen so that the desired time constant is achieved.

The spectral envelope filters 472 select various frequency bands of the pulse train 471 coming from the pulse-height-adder modulator 465, which contains a very large number of harmonic components because of its short duty cycle. These filters 472 may be active or passive, low-pass, high-pass, bandpass, or band reject types. In addition, the characteristic frequency parameters of these filters 472 may be voltage controlled by the outputs 480 and 481 of the coupling networks 478 the inputs of which are connected to the force signal 163, the output 485 of the tremolo generator 484, and a noise filter 494 output. (A tremolo generator 484 here creates modulation of tone color, frequency, and amplitude.) These outputs 480 and 481 of the coupling networks 478 are coupled to the spectral envelope filters 472 by means of the switches S13 and S14.

The outputs 482 of the spectral envelope filters 472 are applied to voltage-controlled amplifiers 490 where the amplitudes of the outputs 482 of the spectral envelope filters 472 are scaled by the outputs of the same coupling networks 478 as are applied to the spectral envelope filters 472, using switches S15 and S16. Thus, the force signal 163 and/or the filtered noise 494 and/or the output of the tremolo generator 484 may be used to control amplitudes of various parts of the spectrum of the pulse-height-modulated frequency pulse. For example, the coupling circuits 478 may be chosen so that the ratios of amplitudes of high frequency partials to those of low frequency partials increase as the force increases. Alternatively, the tremolo generator 484 may be used to modify the same ratio. The filtered noise 494 can also be used similarly to make the signal sound more natural and lifelike.

The force signal 163 is applied to the coupling networks 478 via switch S4, the noise from filter 494 via switch S7, and the tremolo signal 485 via switch S8. The force is statically coupled; the tremolo and filtered noise signals are dynamically coupled.

The tremolo generator 484 is an oscillator the frequency of which may be voltage controlled by the force signal 163 using switch S17. Alternatively, the frequency of the tremolo generator 484 may be controlled by switch S18 by the output of a low-pass filter 483 that is driven by the output 470 of the attack and decay generator 469. This type of control gives a slowly increasing tremolo rate at the beginning of a note.

The outputs 486 of the voltage-controlled amplifiers 490 are applied to an adder 487 together with the output of an amplitude modulator 489 using switch S10. The signal input of this amplitude modulator 489 is filtered noise 491 and is controlled by the differentiator 474 and/or the output 470 of the attack and decay generator 469 by switches S19 and S20, respectively. Control of this modulator 489 by the differentiator 474 gives a burst of filtered noise to the linear adder 487 when the force signal 163 varies rapidly, and control of the noise by the attack-decay generator 470 gives a noise contribution which is roughly proportional to the final amplitude of the waveform generated.

Figure 25:
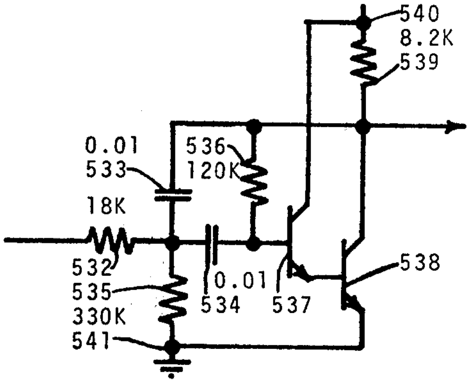
FIG. 25 is a schematic diagram of a novel, inexpensive, stable, easy-to-design, bandpass filter.

The output of the linear adder 487 is one of the outputs 492 of the sound generator. This output 492 is also applied to post-generator filters 488. These filters 488 may be high-pass, low-pass, bandpass, or a combination of these, and serve as simple waveform modification circuits. FIG. 25 illustrates one type of such a filter. The simulation of the muted sounds of familiar wind instruments comprises one use of such circuits.

Auxiliary control of the frequency of the frequency generator 370 by sound generator circuits 103 is achieved by coupling networks 479, the output of which is connected to the FM input 372 of the frequency generator 370. The force signal 163, the output of a noise filter 493, the output 485 of the tremolo generator 484, and the output 463 of the burple generator 462 are applied to this coupling network 479 via switches S5, S6, S9, and S21, respectively. All these inputs, when connected by their respective switches, are dynamically coupled to the output line of the coupling circuits. By suitable choice of the coupling time constants and impedances, one may generate a variety of frequency modulation effects that are useful for removing the mechanical nature of the sounds produced by the final waveform created by the sound generator 103 and that are useful for accurate simulation of a variety of familiar nonpercussive musical instruments. Because of the storage of the frequency control signal 151 in the sample and hold gate 11, the ungated frequency pulse 460 continues after release of note 22 and is used to produce a decay transient of the proper frequency by modulators 461 and 465 after note 22 is released. The ungated pulse 460 is available for a limited period of time, while the control unit is idle, or until this unit is associated with a new note.

Figure 23:
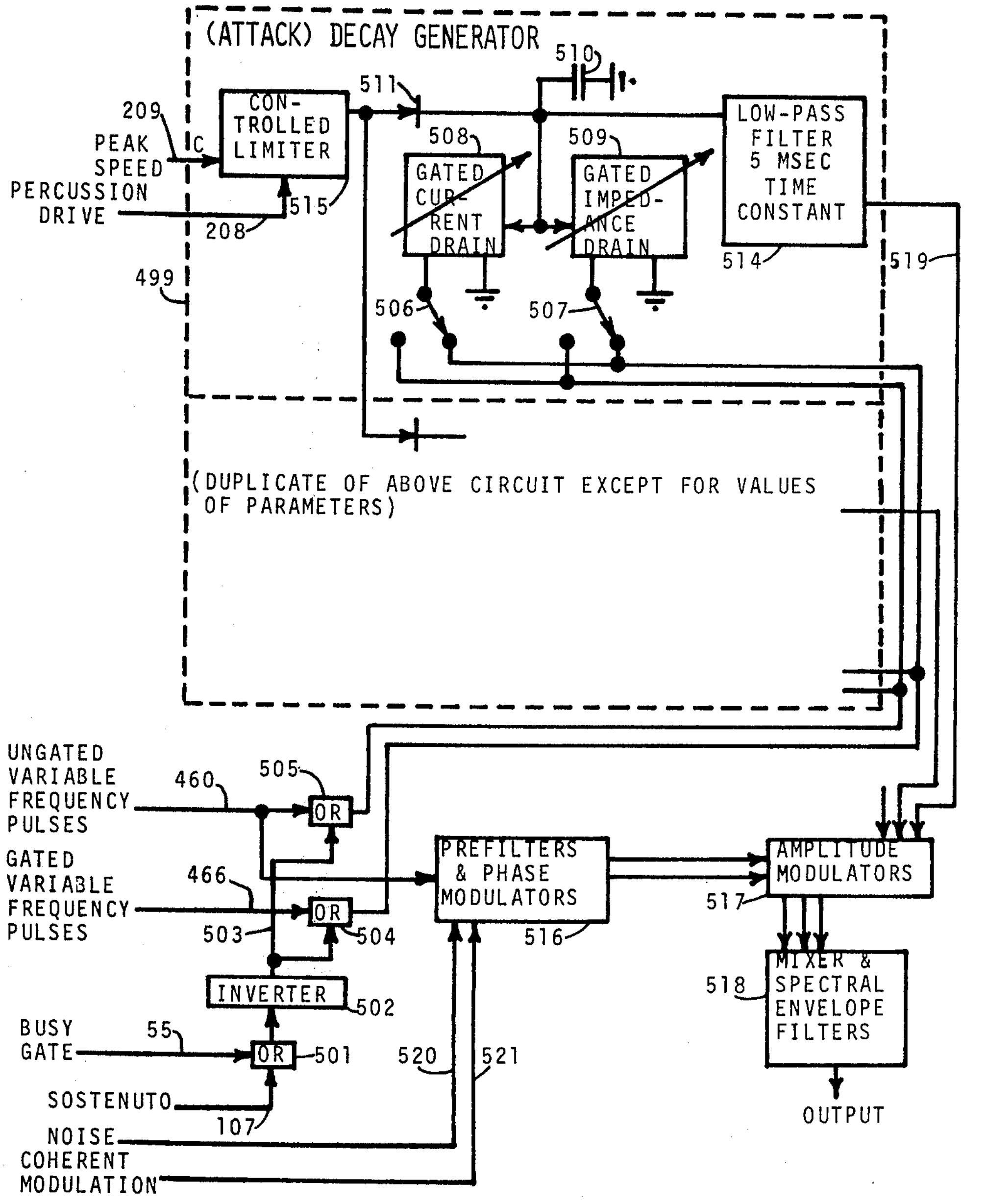
FIG. 23 is a block diagram of the circuit used to create the sounds of percussive musical instruments.

FIG. 23 is a block diagram of a generalized sound generator suitable for creating percussion tones. For these types of sounds, the following features are provided:

1. A decay time that decreases with increasing frequency of the fundamental of the note played.
2. Decay time of a partial (frequency component) of a particular note that is individual to that partial, i.e., the waveform changes during the decay.
3. An amplitude that fluctuates during the tone.

4. An intensity that is determined by the maximum speed with which the note is depressed.

5. A sostenuto to sustain a note after it has been released and to stop the note after the sostenuto is itself released.

6. A spectral envelope that is approximately correct.

7. An attack transient that is short, but not so short that clicks or pops are produced in the sound.

8. A means of automatically repeating the striking of a note to simulate drum rolls and the like.

The maximum speed with which a note 22 is depressed is computed from the force signal 163, as discussed in connection with FIG. 6. The busy gate 55 provided by the control unit 64 is simultaneous with the depression of the note 22, and gates the sound, unless the sostenuto control line 107 of the musical instrument is activated. In this case, the sostenuto control 107 maintains the sounding of the tone. When the busy gate 55 and sostenuto control 107 are both OFF, the note decays away within about 3 cycles after the note is released and can not be revived solely by a reactivation of the sostenuto control 107. To these ends, the busy gate 55 and the sostenuto-control signal 107 are OR'ed 501 together, and the output of the OR gate 501 is inverted 502. The output 503 of the inverter 502 is applied to second and third OR gates 504 and 505. Ungated and gated variable frequency pulses 460 and 466 are applied to the other inputs of the second and third OR gates 504 and 505, respectively. The output of the second 504 or third 505 OR gate, as chosen by switches 506 and 507, respectively, is applied to a gated current 508 or a gated impedance 509 drain. These gated drains 508 and 509 determine the speed with which a capacitor 510 is discharged. This capacitor 510 serves as a charge storage element the potential of which is used to generate the basic amplitude envelope.

The gated drains 508 and 509 are well known circuits for discharging a capacitor, such as shown in the following publications:

a. Arthur Simons, DESIGN OF A HIGH SPEED A/D CONVERTOR, Report No. 269, para. 3.1, p. 21–23 (June 1968, Dept. of Computer Science, Univ. of Illinois, Urbana, Illinois).

b. G. A. Korn and T. M. Korn, ELECTRONIC ANALOG COMPUTERS, p. 285, FIG. 7.30, p. 109 discussion, p. 346, p. 347, p. 171 (McGraw-Hill, 1956) Second edition.

c. Melvin Klerer and G. A. Korn, DIGITAL COMPUTER USERS' HANDBOOK, p. 4–292, FIG. 4, 10–35 (McGraw-Hill, 1967).

d. L. Levine, METHODS FOR SOLVING ENGINEERING PROBLEMS, chap. 5 (McGraw-Hill, 1964).

e. J. Millman and H. Taub, PULSE, DIGITAL AND SWITCHING WAVEFORMS, chap. 17 (McGraw-Hill, 1965).

f. J. T. Ton, DIGITAL AND SAMPLE-DATA CONTROL SYSTEMS, chap. 4 (McGraw-Hill, 1959).

g. G. J. Thaler, M. P. Pastel, ANALYSIS AND DESIGN OF NONLINEAR FEEDBACK CONTROL SYSTEMS, chap. 10 (McGraw-Hill, 1962).

h. Z. Menadal and B. Mirtes, ANALOG AND HYBRID COMPUTERS, 442–443 (Iliffe Books, London, 1968).

i. A. J. Monroe, DIGITAL PROCESSES FOR SAMPLED DATA SYSTEMS, chap. 6 (Wiley, New York, 1962).

j. R. E. Marchol, W. P. Tanner, S. M. Alexander, SYSTEM ENGINEERING HANDBOOK, chap. 32 (McGraw-Hill, 1965).

k. H. V. Malmstadt, C. G. Enke, DIGITAL ELECTRONICS FOR SCIENTISTS, chap. 7 (W. A. Benjamin, New York, 1969), esp. Fig. 7—31.

l. J. G. Truxal, CONTROL ENGINEERS'HANDBOOK, chap. 2 (McGraw-Hill, 1958).

m. W. J. Poppelbaum, COMPUTER HARDWARE THEORY, chap. 7 (Macmillan, 1972).

n. E. I. Jory, SAMPLE-DATA CONTROL SYSTEMS, chap. 1 (Wiley, New York 1958).

The storage capacitor 510 is charged up through a diode 511 in each decay generator 499. The diodes 511, in turn, are driven in common by the output of a controlled limiter 515. The controlled limiter 515 is excited by the percussion drive signal 208 and the peak speed 209. The peak-speed potential 209 limits the potential of the percussion drive signal 208 transmitted by the controlled limiter 515. This limiter 515 may be the ordinary type of diode limiter followed by an impedance-buffer amplifier, say, an emitter follower. Each time a percussion-drive pulse 208 occurs, the capacitor in each decay generator 499 is charged up to a potential equal to the peak-speed potential 209. The diode 511 coupling to the capacitors 510 allows them to decay at independent rates.

Thus, with variable frequency excitation of the gate drains 508 and 509, the higher the frequency of the note 22 the more frequently the charge is drained from the capacitor 510 storing a charge proportional to the output 209 of the peak detector 207, and the faster the capacitor potential decays. The ungated and gated frequency pulses 460 and 466 are obtained from FIGS. 16, 17, and 18. The gated pulses drain the capacitor only while the note is depressed. If, with the sostenuto signal 107 activated, gated pulses are used to drain the capacitor 510, the capacitor voltage will be held at the value present when the note 22 is released. The current drain 508 provides a linear decay in potential; the impedance drain 509 provides an exponential decay in potential.

A low-pass filter 514 in the output of the decay generator 499 tempers the attack of the notes produced by the potential of th capacitor 510 just enough to remove any click or pop associated with the start of the note. A time constant of 5 msec usually suffices for this purpose.

A plurality of drains with individual values of the drain resistor provide a plurality of decay rates with which to modulate various parts of the spectrum of a note 22, as will be seen momentarily.

The ungated variable frequency pulses 460 are applied to phase modulators and to filters 516 that divide the spectrum. (For example, low-pass filters with 500 Hz, 1000 Hz. and 2000 Hz cutoffs may be used.) These filters 516 may also attenuate the signals passed by individual amounts. (In the example, the 500 Hz cutoff filter may attenuate the signal by a factor of 1, the 1000 Hz cutoff filter may attenuate the signal by a factor of ½, the 2000 Hz cutoff filter by a factor of ¼.) A plurality of balanced amplitude modulators 517 exists, each with two inputs, one for the modulating signal and one for the modulated signal. Each of the outputs of the spectrum dividing filters is applied to the modulated signal input of one of the balanced modulators; the other input is excited by one of the outputs 519 of the decay generator 499. Thus, each part of the audio spectrum may have a characteristic decay rate.

The outputs of the modulators 517 are applied to a plurality of inputs of a mixer and spectral envelope shaper 518. These may be normal formant filters.

Noise 520 and coherent modulation 521, which may be derived from a suitable oscillator, such as a sine wave oscillator, may also be applied to the prefilters and phase modulators 516 to provide more interesting and lifelike tones. A suitable phase modulator is shown in FIG. 19 and discussed on page 65 where identified as a pulse delay modulator. The pre-filters are low-pass filters having the cutoff frequencies typically set forth above.

As with nonpercussive sound generators, the ungated frequency pulse 460 may be used to produce a decay transient after note 22 is released, and is available while the control unit is idle for a limited period of time or until it is associated with a new note. Because of the gradual discharge of the holdoff capacitor 302 at the lockout input, control units go into the idle-ready state and then into the busy state upon demand in order of their age since retirement, upto a limit, to the idle-reserve state.

Figure 24:
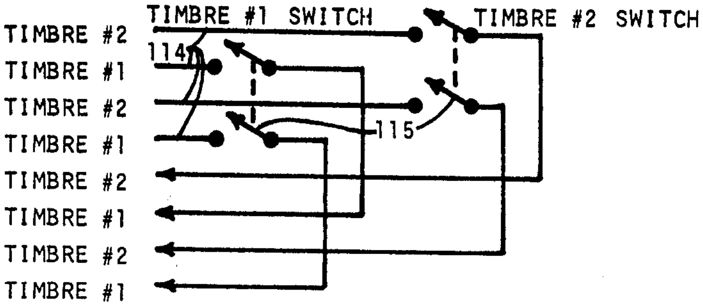
FIG. 24 is a schematic drawing of an elementary tone color control system.

FIG. 24 displays a primitive form of the tone color controls 105. The tone color controls 105 are simply switches 115 that connect the sound generator 103 bus lines 114 to the chorus generators 106. Each timbre switch 115 connects all sound generators 103 creating that particular timbre to the chorus generators 106 associated with each tone generator 80.

FIG. 25 is a schematic diagram of a post-generator filter 488 shown in FIG. 22. This particular filter is of the bandpass type with a center frequency of approximately 3 kHz, a Q of 10, and a gain of 10. This particular design is very useful for the following reasons:

1. A minimum number of components is used. The filter is inexpensive.

2. The transistor 538 may be operated at a low collector potential and a selected current level, thus achieving the optimum signal-to-noise ratio. In addition, the source impedance into the base of the transistor 538 is low, which further improves the signal-to-noise ratio.

3. The feedback resistor 536 is both a filter impedance and a stabilizer of the static operating level. This design minimizes component count and provides a very stable operating point over a wide range of operating temperature.

The circuit operates as follows: The input is applied to a first end of a first resistor 532. The other end of this resistor 532 is connected to the second ends of a first capacitor 534, a second capacitor 533, and a second resistor 535. The first end of capacitor 534 is connected to the first end of a third resistor 536 and to the base of a first transistor 537. The capacitors 533 and 534 block any static current that would flow in the remainder of the circuit and that would affect the operating points of the transistor 537 and a second transistor 538. The collector of the first transistor 537 is connected to a first supply potential 540, as is the first end of a fourth resistor 539. The second end of resistor 539 is connected to the first end of capacitor 533, to the second end of resistor 536, and to the collector of the transistor 538. The emitter of the transistor 537 is connected to the base of the transistor 538. The emitter of transistor 538 and the first end of resistor 535 are connected to a second supply potential 541.

Circuit elements 532 through 536 are circuit elements characteristic of a common type of multiple feedback filter. Transistors 537 and 538 are assumed to have a high current gain, e.g., about 500, and, in conjunction with resistor 539, comprise a high input impedance, high gain voltage amplifier for small signals. Resistors 536 and 539 determine the operating point of transistor 538. Once resistor 536 is determined from requirements of the filter and the input impedance of transistor 537, resistor 539 may be appropriately chosen to operate transistor 538 at the appropriate current and collector-to-emitter potential for low noise operation of transistor 538. The static feedback between the collector of transistor 538 and the base of transistor 537 provides strong static degeneration, which gives a very stableoperating point for transistor 538. Transistor 537 is used basically as an emitter follower and provides a high input impedance to the rest of the circuit, which is designed to use a very high gain amplifier comprised of transistors 537 and 538 and resistor 539. This design restriction permits rapid, accurate determination of the circuit values for various types of bandpass filters.

Tables 2 through 7 give the settings of switches S1 through S21 and list the detailed characteristics of the various block units of FIG. 22 that specify sound generators that will accurately produce sounds of the trumpet, flute, French horn, oboe, and trombone. The values of the parameters specified are typical values and, in many cases, may be varied significantly. For example, the desired amount of frequency modulation of the voltage-controlled oscillator 370 caused by variation of the force signal 163 via the coupling circuits 479 depends upon the musical situation, such as whether the trumpet style normally used in classical music is to be simulated or the style usually used in jazz.

Abbreviations are explained in Table 8.

Table 2

Switch settings in FIG. 22 to simulate certain instruments.

| Switch number | Description | Trumpet | Flute | Horn | Oboe | Trombone |
|---|---|---|---|---|---|---|
| S1 | Force pulse width control | OFF | OFF | ON | OFF | OPT |
| S2 | Burple pulse width control | ON | OFF | OFF | OFF | ON |
| S4 | Force control of SE filters or VCA | ON | ON | OPT | ON | ON |
| S5 | Force control of FM | ON | ON | OFF | ON | ON |
| S6 | Noise control of FM | ON | ON | ON | ON | ON |
| S7 | Noise control of SE filters | ON | ON | OFF | OFF | ON |
| S8 | Tremolo generator control of SE filters and/or VCA's | OFF | ON | OFF | OPT | OFF |
| S9 | Tremolo generator control of FM | OFF | ON | OFF | OPT | OFF |
| S10 | Addition of modulated noise | OFF | ON | OFF | OFF | OFF |
| S11 | Addition of modulated frequency multiple | OFF | OPT | OFF | OPT | OFF |

Table 2-continued

Switch settings in FIG. 22 to simulate certain instruments.

| Switch number | Description | Trumpet | Flute | Horn | Oboe | Trombone |
|---|---|---|---|---|---|---|
| S13 | Frequency control of SE | OPT | OFF | OPT | OFF | OPT |
| S14 | filters | | | | | |
| S15 | Control of VCA's | ON | ON | OPT | ON | ON |
| S16 | Control of VCA's | ON | ON | OPT | ON | ON |
| S17 | Force control of tremolo generator | OPT | OPT | OFF | OPT | OPT |
| S18 | Envelope control of tremolo generator | ON | ON | OFF | ON | ON |
| S19 | Burst control of added noise | OFF | ON | OFF | OFF | OFF |
| S20 | Envelope control of added noise | OFF | ON | OFF | OFF | OFF |
| S21 | Burple coupling to FM | ON | OFF | ON | OFF | ON |
| FM | Frequency modulation | | | | | |
| OPT | Optional | | | | | |
| SE | Spectral envelope | | | | | |
| VCA | Voltage-controlled amplifier | | | | | |

Table 3

Specifications of units to simulate trumpet tones.

| Reference number | Description | Comments |
|---|---|---|
| 461 | PW:2 μsec IN,100 μsec OUT;50% burple generator modulation | Injects burple |
| 462 | ≈150 Hz, 20 msec decay τ | |
| 465 | 100% modulation (ON–OFF control) | Basic envelope imposed on pulse train |
| 467 | Amplitude increase by 1.5 times over 2 octaves | Constant width pulse gives added 6 D/O increase |
| 469 | 10 cycles of attack,20 msec decay τ | |
| 472 | HPF:750 Hz,6 D/O;LPF:1.8 kHz, 12 & 24 D/O | 12 & 24 D/O filters part of 4 stage RC filter with 12 & 24 D/O taps |
| 473 | (Not used) | |
| 474 | RC type,20 msec τ | |
| 475 | (Not used) | |
| 478 | No SE control | Control of SE HPF part OPT |
| 479 | Force causes ≈±1% FM,burple causes ≈.5% FM peak;noise causes ≈.1% RMS | Additional FM sometimes |
| 483 | (Not used) | |
| 484 | (Not used) | |
| 487 | Passive mixer | |
| 488 | BPF:2.5 kHz,Q=6,G=1;BPF:9.5 kHz,Q=6,G=2;filter OUTS added together | |
| 489 | (Not used) | |
| 490 | Force controls amount of 12 D/O signal from OFF to twice 24 D/O signal | |
| 491 | (Not used) | |
| 493 | LPF:12 D/O,2 Hz | |
| 494 | LPF:6 D/O,1.5 Hz | |

Table 4

Specifications of units to simulate flute tones.

| Reference number | Description | Comments |
|---|---|---|
| 461 | PW:2 μsec IN,150 μsec OUT;no modulation | |
| 462 | (Not used) | |
| 465 | 100% modulation | |
| 467 | ≈50% amplitude increase/0 | |
| 469 | 40 cycles of attack,.1 sec decayτ | |
| 472 | HPF:900 Hz,6 D/O in series with LPF:900 Hz,24 D/O;BPF:1.1 kHz, Q=3 | |
| 473 | 100% modulation | OPT |
| 474 | RC type,20 msecτ | |
| 475 | Divided by 2 | |
| 478 | No SE control | |
| 479 | Force causes ±.5% FM;noise causes ±1% FM jitter | |
| 483 | LPF:6 D/O,.1 secτ | |
| 484 | FREQ:1 to 7 Hz if force controlled;5.5 Hz if not force controlled | |
| 487 | Passive adder | |
| 488 | (Not used) | |

Table 4-continued

Specifications of units to simulate flute tones.

| Reference number | Description | Comments |
|---|---|---|
| 490 | Force varies amount of 1.1 Hz BPF signal from 50 to 200% of other filter | Primary effect: increase low & mid range 2nd harmonic |
| 491 | BPF:1.0 Hz,Q=2 | |
| 493 | HPF:6 D/O,400 Hz,RC type | |
| 494 | LPF:6 D/O,10 Hz,RC type | |

Table 6

Specifications of units to simulate oboe tones.

| Reference number | Description | Comments |
|---|---|---|
| 461 | (Not used) | |
| 462 | (Not used) | |
| 465 | 100% modulation (ON–OFF control) | |
| 467 | ≈20% amplitude increase/0 | |
| 469 | ≈5 cycles of attack,30 msec decayτ | |
| 472 | BPF:1.1 kHz,Q=5 added to BPF: 3 kHz,Q=5;LPF:700 Hz,18 D/O | |
| 473 | 100% modulation | OPT for subharmonic burst |
| 474 | RC type,30 msecτ | OPT for subharmonic burst |
| 475 | Divided by 2 | |
| 478 | No SE control | |
| 479 | Force causes ±.5% FM | |
| 483 | RC type, .1 secτ | OPT automatic vibrato |
| 484 | FREQ:1 to 7 Hz if force controlled;5.5 Hz if not force controlled | OPT automatic vibrato |
| 487 | Passive adder | |
| 488 | (Not used) | |
| 489 | (Not used) | |
| 490 | Force varies amount of BPF's signal from 20% to 200% of LPF LPF fixed output | |
| 491 | (Not used) | |
| 493 | (Not used) | |
| 494 | (Not used) | |

Table 5

Specifications of units to simulate French horn tones.

| Reference number | Description | Comments |
|---|---|---|
| 461 | PW:2 μsec IN, 100 to 600 μsec OUT controlled by the force | |
| 462 | 50 Hz, 50 msec decayτ | |
| 465 | 100% modulation | |
| 467 | 75% amplitude increase/0 | |
| 469 | 7 cycles of attack,20 msec decayτ | |
| 472 | LPF:1 kHz,6 D/O in series with | |
| 473 | BPF:450 Hz,Q=3 | |
| 474 | RC type,50 msecτ | |
| 475 | (Not used) | |
| 478 | (Not used) | |
| 479 | Force causes ≈.2% FM;burple causes ≈1% FM peak;noise causes ≈.3% RMS | |
| 483 | (Not used) | |
| 484 | (Not used) | |
| 487 | (Not used) | |
| 488 | (Not used) | |
| 489 | (Not used) | |
| 490 | (Not used) | |
| 491 | (Not used) | |
| 493 | LPF:12 D/O,2 Hz | |
| 494 | (Not used) | |

Table 7

Specifications of units to simulate trombone tones.

| Reference number | Description | Comments |
|---|---|---|
| 461 | PW: 2 μsec IN,100 μsec OUT;50% burple generator modulation | |
| 462 | 75 Hz, 50 msec decayτ | |
| 465 | 100% modulation (ON-OFF | |

Table 7-continued

Specifications of units to simulate trombone tones.

| Reference number | Description | Comments |
|---|---|---|
| | control) | |
| 467 | 50% amplitude increase/0 | |
| 469 | 8 cycles of attack,30 msec decayτ | |
| 472 | HPF:350 Hz,6 D/O;LPF:800 Hz, 12 & 30 D/O | See comments for trumpet |
| 473 | (Not used) | |
| 474 | RC type,50 msecτ | |
| 475 | (Not used) | |
| 478 | No SE control | |
| 479 | Force causes ±1% FM;burple causes .1% FM peak;noise causes .1% RMS | |
| 483 | (Not used) | |
| 484 | (Not used) | |
| 487 | Passive adder | |
| 488 | BPF:1.0 kHz,Q=6,G=1;BPF:2.5 kHz,Q=6,G=1.5;BPF:6 kHz,Q=6, G=2 | |
| 489 | (Not used) | |
| 490 | Force controls amount of 12 D/O signal from OFF to twice 30 D/O signal | |
| 491 | (Not used) | |
| 493 | LPF:12 D/O,2 Hz | |
| 494 | LPF:6 D/O,1.5 Hz | |

Table 8

List of abbreviations used.

| Abbreviation | Explanation of abbreviation |
|---|---|
| BPF | Bandpass filter. Center frequency, quality, and gain listed in that order |
| D/O | DB per octave |

Table 8-continued

List of abbreviations used.

| Abbreviation | Explanation of abbreviation |
|---|---|
| FM | Frequency modulation |
| FREQ | Frequency (of an oscillator of signal) |
| G | Gain |
| HPF | High-pass filter. Frequency at which OUT is 3 dB down and asymptotic slope of roll off listed in that order |
| IN | Input |
| LPF | Low-pass filter. Frequency at which OUT is 3 dB down and asymptotic slope of roll off listed in that order |
| O | Octave |
| OPT | Optional |
| OUT | Output |
| PW | Pulse width |
| RC | Resistor-condenser filter |
| SE | Spectral envelope |
| $\tau$ | Time constant |
| VCA | Voltage-controlled amplifier |
| ≈ | Approximately |

Figure 26:
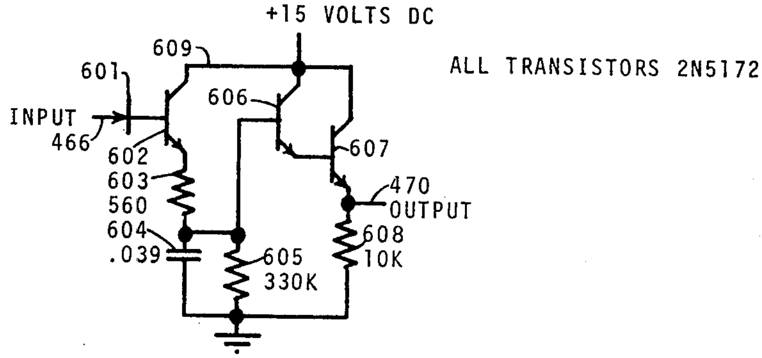
FIG. 26 is a detailed circuit of a combined attack and decay transient generator and an intensity vs frequency pulse height modulator.

FIG. 26 shows a detailed circuit of a first combined attack and decay transient generator 469 and an intensity vs frequency pulse height modulator 467. The gated frequency pulse 466 is applied to the base of transistor 602, the collector of which is connected to a positive supply potential 609. Transistor 602 acts as an emitter follower, charging up the capacitor 604 through resistor 603, the two ends of which are connected to the emitter of transistor 602 and the capacitor 604, the second terminal of which is connected to ground. A second resistor 605 is connected across capacitor 604 and serves to discharge this capacitor. The junction of capacitor 604 and resistor 603 is also connected to the base of a Darlington connected pair of transistors used as an emitter follower in combination with resistor 608.

The rate at which the potential across capacitor 604 increases when a gated frequency pulse is applied depends upon the value of capacitor 604, the resistor 603, the resistor 605, and the duty cycle of the applied frequency pulse 466. If this duty cycle increases as the frequency of this pulse 466 is increased, the rise time of the potential on the capacitor 604 and consequently that of the output line 470 will decrease. Thus, if the signal on line 466 is a pulse of constant width but of increasing frequency, this circuit will produce an attack transient of decreasing duration, a situation similar to many other types musical instruments, such as the trumpet.

When the frequency pulse ceases, the potential across capacitor 604 decreases to zero at a rate determined by the value of the capacitor 604 and the resistor 605, thus providing a decay transient of exponential shape and of a duration that may be varied essentially independently of the attack transient duration by variation of the value of the resistor 605.

This type of attack and decay generator also has an output related to the frequency of the applied pulse 466. The effective charging resistance for the capacitor 604 is the value of the resistor 603 divided by the duty cycle of the pulse train 466. The discharge path is by way of resistor 605. The static potential achieved on the capacitor 604 some time after the pulse train 466 is initially applied is the ratio of the effective resistance mentioned above and the resistor 605. Since the effective resistance varies if a constant width pulse of varying frequency is applied, the output 470 achieves a static potential related to the frequency of the input pulse train 466.

This type of attack and decay generator provides a $1 - \exp(-t)$ type of envelope attack function and an $\exp(-t)$ type of decay envelope function.

Figure 27:
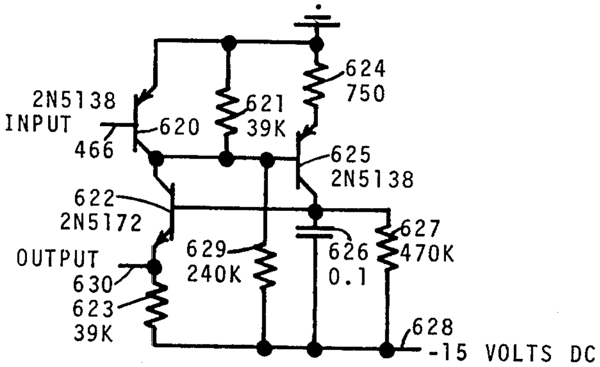
FIG. 27 is a detailed circuit of a combined attack and decay transient generator and an intensity vs frequency pulse height modulator.

FIG. 27 is a detailed circuit of a second attack and decay generator that provides an attack transient of the type $\exp(t) - 1$ and the same type of decay transient as the circuit shown in FIG. 26. The gated frequency pulse is applied to a gating transistor 620 so that when the pulse is OFF, the transistor 620 is ON. In this situation, the transistor 625 is held in the OFF state and, thus, there is no current flowing in the collector circuit of transistor 625. Resistor 627 then drains any charge from capacitor 626 and turns OFF transistor 622. Thus, when the frequency pulses 466 are absent for a sufficiently long period of time, both transistors are OFF and the output 630 is at the negative potential 628.

Transistors 625 and 622 are regeneratively connected. When the gate transistor 620 is turned OFF, by the appearance of a pulse on line 466, resistor 629 provides current to turn ON transistor 625 for the duration of the frequency pulse. Current proportional to the resistor 624 is fed to the capacitor 626 via the collector of transistor 625, which raised the potential on the capacitor 626 and also the potential appearing at the output 630. The current through the collector-emitter circuit of transistor 622 further lowers the potential at the base of transistor 625, which further increases the charging current supplied to the capacitor, and thus a regenerative action occurs, providing the desired exponentially increasing waveform at the output 630.

The charge delivered to the capacitor 626 via the collector circuit of transistor 625 is proportional to the duty cycle of the pulse applied to the gating transistor 620, and, thus, if a constant width variable frequency pulse train is used for the gated frequency pulse 466, an attack transient duration proportional to the period of the pulse appearing on line 466 will be obtained.

The average current delivered to the capacitor is a result of the current proportional to the frequency as mentioned previously and the current drained via the resistor 627. The potential ceases to change when these two currents become equal, and reaches a potential then related to the frequency of the pulse train 466.

When the frequency pulses 466 cease, the gating transistor 620 is held ON and the potential across capacitor 626 decays as described for the initial conditions above. This decay rate is determined by the values of the capacitor 626 and the resistor 627.

The circuit shown in FIG. 27 thus provides an exponentially increasing attack transient, an exponentially decreasing decay transient, an attack duration that decreases as the frequency is increased and an output level during steady state conditions that is related to the frequency of the input pulse train 466.

Figure 28:
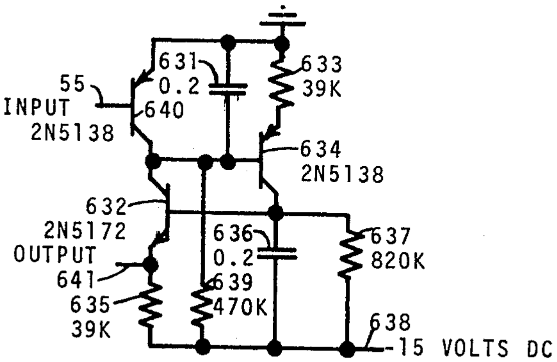
FIG. 28 is a detailed circuit of a combined attack and decay transient generator.

FIG. 28 is a detailed circuit diagram of a third attack and decay transient generator 469. This circuit is very similar to that shown in FIG. 27, except that this circuit provides a fixed duration of the attack transient, i.e., the duration of the attack transient is not a function of the frequency of the gating signal applied to the input of the circuit, but one that has either undershoot or overshoot, depending on the relative values of the components.

The gating signal applied to the gating transistor 640 in this circuit is the busy gate, that is, a signal that goes ON and stays ON for the duration of the sounding of a particular note. When this gating signal, the busy gate 55, goes ON, the gating transistor 640 is turned OFF, allowing current to flow through the resistor 639, which lowers the potential on capacitor 631. Transistor 634 stays in the OFF state until the potential across capacitor 631 has increased sufficiently to forward bias the base-emitter junction of the transistor 634, which is about 0.5 volts if the transistor 634 is a silicon type. This provides a delay period from the turning ON of the gating signal 55 until the potential of the output 641 begins to increase, a delay that is useful in some cases to eliminate effects of key bounce in other parts of the sound generator 103.

When transistor 634 is turned ON as described above, regenerative action similar to that described for the circuit in FIG. 27 follows. In this case, the effective time constant of the exponentially rising output signal on line 641 is the square root of the product of the time constants of resistor 633 with capacitor 636 and resistor 635 with capacitor 631.

The values of the final potentials appearing across the capacitors 631 and 636 when the gating signal 55 is ON for a sufficiently long period of time is determined by the resistors 633 and 635. The relative rates of rise of the potentials across these capacitors 631 and 636 is determined by the aforementioned time constants, and, if the time constant formed by resistor 633 and capacitor 636 is shorter than that formed by resistor 635 and capacitor 631, the potential appearing at the output 641 will overshoot the final steady-state value during the attack transient period. If the relative values of these two time constants are reversed, then the output potential 641 will undershoot the final value, or, in other words, it will approach the final steady-state value, after the initial exponentially increasing manner, in a style similar to that of the attack-decay generator shown in FIG. 26.

Thus, the attack-decay generator shown in FIG. 28 produces an attack transient that initially increases in a positively increasing exponential fashion, followed either by an overshoot, an undershoot, or an even transition to the steady state. The decay transient duration is determined by the values of the capacitor 636 and the resistor 637, assumed to be large compared with the value of the resistor 633.

The specific embodiments described herein are by way of example for illustrating the best mode now contemplated for practicing the invention. It is evident that those skilled in the art may now make numerous modifications and uses of and departures from the specific embodiments disclosed herein without departing from the inventive concepts. Consequently, the invention is to be construed as limited solely by the spirit and scope of the appended claims.

We claim:

1. Sound generating apparatus comprising, output means, a plurality of tone generators coupled to said output means for providing note signals with each including means for producing any of a large common plurality of frequencies characterizing respective musical notes over at least an octave, a plurality of note selecting means for selecting note signals characteristic of selected notes for production by said tone generators where each note selecting means includes means upon selection for providing a note selection signal representing a unique contribution to a signal waveform on said output means which note selection signal is representative of at least one of note pitch, speed of note selection and force applied to note selecting means, control means coupled to said tone generators for providing a continuous data signal representative of the selected note signals and for selecting which of said tone generators coupled to said output means is to provide said note signal, and scanning means responsive to said note selecting means for coupling the selected note selection signals to said control means, wherein said note selecting means comprises a plurality of force sensitive members for receiving at least one of vertical and horizontal forces and means associated with each such member for providing at least one of vertical and horizontal signals respectively representative of the vertical and horizontal forces applied thereto.

2. Sound generating apparatus in accordance with claim 1 wherein said force sensitive members are semiflexible means and have at least one strain sensor affixed thereto comprising means for providing said force signals.

3. Sound generating apparatus in accordance with claim 1 and further comprising first and second orthogonal flat springs supporting each member for providing vertical and horizontal restoring forces respectively.

4. Sound generating apparatus in accordance with claim 1 and further comprising means responsive to said forces for controlling the rate of repetition of a characteristic of the signal provided by the associated tone generator.

5. Sound generating apparatus in accordance with claim 1 and further comprising automatic repeat circuit means associated with and coupkled to a selected tone generator coupled to and driven by a voltage-controlled oscillator responsive to said forces.

6. Sound generating apparatus in accordance with claim 5 wherein said automatic repeat circuit means comprises means for providing percussive tone signals and further comprising, amplifying means coupled between a source of a signal representative of one of said forces and said voltage-controlled oscillator input for preventing automatic repetition when the force is less than a predetermined value.

7. Sound generating apparatus in accordance with claim 4 and further comprising means responsive to the rate of change of one of said forces for controlling the intensity of the tone signal provided by an associated tone generator.

8. Sound generating apparatus comprising, output means, a plurality of tone generators coupled to said output means for providing note signals with each including means for producing any of a large common plurality of frequencies characterizing respective musical notes over at least an octave, a plurality of note selecting means for selecting note signals characteristic of selected notes for production by said tone generators where each note selecting means includes means upon selection for providing a note selection signal representing a unique contribution to a signal waveform on said output means which note selection signal is representative of at least one of note pitch, speed of note selection and force applied to note selecting means, control means coupled to said tone generators for providing a continuous data signal representative of the selected note signals and for selecting which of said tone generators coupled to said output means is to provide said note signal, and scanning means responsive to said note selecting means for coupling the selected note selection signals to said control means, wherein said note selecting means comprises means defining a keying capacitance and means responsive to a force coupled to and for varying said keying capacitance.

9. Sound generating apparatus in accordance with claim 8 and further comprising means for converting said capacitance into a time interval representative thereof.

10. Sound generating apparatus in accordance with claim 9 wherein the latter means comprises a capacitor and means for charging said capacitor for said time interval and discharging said capacitor after said time interval.

11. Sound generating apparatus in accordance with claim 8 wherein said keying capacitance comprises a keyable plate separated from another plate by a material of high dielectric constant.

12. Sound generating apparatus in accordance with claim 11 and further comprising a conductive elastomer sandwiched between said dielectric material and one of said plates.

13. Sound generating apparatus in accordance with claim 8 wherein said keying capacitance introduces delay and further comprising means for deriving a signal representative of the force applied in note selection by sensing the time delay introduced by said keying capacitance in excess of a minimum time delay sufficient to establish selection of the associated note.

14. Sound generating apparatus in accordance with claim 13 wherein said means for sensing comprises means for sensing the rate of rise of a signal associated with said keying capacitance.

15. Sound generating apparatus in accordance with claim 8 and further comprising means responsive to variation in said keying capacitance for providing a potential change, and means for detecting the time interval for the latter potential change to reach a predetermined magnitude to determine selection of a note.

16. Sound generating apparatus comprising, output means, a plurality of tone generators coupled to said output means for providing note signals with each including means for producing any of a large common plurality of frequencies characterizing respective musical notes over at least an octave, a plurality of note selecting means for selecting note signals characteristic of selected notes for production by said tone generators where each note selecting means includes means upon selection for providing a note selection signal representing a unique contribution to a signal waveform on said output means which note selection signal is representative of at least one of note pitch, speed of note selection and force applied to note selecting means, control means coupled to said tone generators for providing a continuous data signal representative of the selected note signals and for selecting which of said tone generators coupled to said output means is to provide said note signal, and scanning means responsive to said note selecting means for coupling the selected note selection signals to said control means, wherein said tone generators comprise, an amplitude modulator, and a frequency divider coupled to said amplitude modulator having means for providing a transient pulse train modulated by said amplitude modulator in accordance with a predetermined envelope.

17. Sound generating apparatus comprising, note selecting means for providing note selection signals characteristic of selected musical notes, a source of electrical signals having audio frequency components and at least one transient component, means coupled to said source of electrical signals and responsive to said note selection signals for controlling the frequencies of said frequency components and said transient component, means coupled to said note selecting means for providing an ON signal to said source of electrical signals only if an associated note is selected by said note selecting means, and means coupled to said source of electrical signals for controlling the said transient commponent as a function of the frequency of the associated selected musical note.

18. Sound generating apparatus in accordance with claim 17 and further comprising means coupled to said source of electrical signals for additionally controlling said frequency components in accordance with the degree of selection by said note selecting means.

19. Sound generating apparatus in accordance with claim 17 wherein said source includes at least one transient component which is an attack transient.

20. Sound generating apparatus in accordance with claim 17 wherein said source includes at least one transient component which is a decay transient.

21. Sound generating apparatus in accordance with claim 19 wherein said means for controlling includes means for controlling the duration of said attack transient as a function of the frequency of the associated selected musical note.

22. Sound generating apparatus in accordance with claim 20 and further comprising means coupled to said source for changing the relative amplitudes of said audio frequency components as a function of time.

23. Sound generating apparatus in accordance with claim 19 and further comprising means coupled and responsive to said ON signal for initiating a perturbation in said frequencies for a predetermined time duration.

* * * * *